US010544996B2

(12) United States Patent
Honda et al.

(10) Patent No.: US 10,544,996 B2
(45) Date of Patent: Jan. 28, 2020

(54) INTERNAL COMBUSTION ENGINE

(71) Applicants: Akihiro Honda, Susono (JP); Shin-ichi Ohkoshi, Tokyo (JP)

(72) Inventors: Akihiro Honda, Susono (JP); Shin-ichi Ohkoshi, Tokyo (JP)

(73) Assignees: TOYOTA JIDOSHA KABUSHIKI KAISHA, Toyota-Shi (JP); THE UNIVERSITY OF TOKYO, Tokyo (JP)

( * ) Notice: Subject to any disclaimer, the term of this patent is extended or adjusted under 35 U.S.C. 154(b) by 283 days.

(21) Appl. No.: 15/613,566

(22) Filed: Jun. 5, 2017

(65) Prior Publication Data
US 2017/0350659 A1 Dec. 7, 2017

(30) Foreign Application Priority Data

Jun. 7, 2016 (JP) .................................. 2016-113814

(51) Int. Cl.
*F28D 20/00* (2006.01)
*B60K 6/12* (2006.01)
(Continued)

(52) U.S. Cl.
CPC ............ *F28D 20/0034* (2013.01); *B60K 6/12* (2013.01); *C01G 23/04* (2013.01); *C09K 5/063* (2013.01);
(Continued)

(58) Field of Classification Search
CPC ..... F28D 20/0034; F28D 20/02; C09K 5/063; C09K 5/02; C01G 23/04; B60K 6/12;
(Continued)

(56) References Cited

U.S. PATENT DOCUMENTS

| 2010/0162972 A1* | 7/2010 | Hayashi ............. B60H 1/00492 123/41.14 |
| 2013/0263574 A1 | 10/2013 | Levin et al. |
| 2016/0237331 A1 | 8/2016 | Ohkoshi et al. |

FOREIGN PATENT DOCUMENTS

DE  10 2013 206087 A1  10/2013
JP     2007032287 A     2/2007
(Continued)

OTHER PUBLICATIONS

Hiroko Tokoro, et al., "External stimulation-controllable heat-storage ceramics", Nature Communications 6, 2015, Article No. 7037, Doi: 101.038/ncomms8037, May 12, 2015, 23 pages.

*Primary Examiner* — Jacob M Amick
*Assistant Examiner* — Charles Brauch
(74) *Attorney, Agent, or Firm* — Hunton Andrews Ku

(57) ABSTRACT

The waste heat recovery and dissipation apparatus incorporates a heat storage/dissipation material containing a new titanium oxide. When a pressure received by the heat storage/dissipation material from a coolant flowing through a flow channel is increased to a predetermined pressure PHR (about 60 MPa) or higher in a state where the crystal structure of the new titanium oxide is a λ-phase, the heat stored in the heat storage/dissipation material is released to the coolant. When a temperature of the heat storage/dissipation material is increased to a predetermined temperature THS (about 460 K) or higher by the heat of exhaust gas flowing a gas flow channel in a state where the crystal structure of the new titanium oxide is β-phase, the heat of the exhaust gas is stored in the heat storage/dissipation material.

9 Claims, 13 Drawing Sheets

(51) Int. Cl.

| | | |
|---|---|---|
| *C01G 23/04* | (2006.01) | |
| *C09K 5/06* | (2006.01) | |
| *F01N 5/02* | (2006.01) | |
| *G08B 6/00* | (2006.01) | |
| *G06F 3/01* | (2006.01) | |
| *C09K 5/02* | (2006.01) | |

(52) U.S. Cl.
CPC ............... *F01N 5/025* (2013.01); *C09K 5/02* (2013.01); *G06F 3/011* (2013.01); *G06F 3/016* (2013.01); *G08B 6/00* (2013.01)

(58) Field of Classification Search
CPC ...... F01N 5/025; Y02P 20/124; Y02P 20/129; Y02E 60/145; G06F 3/016; G06F 3/011; G08B 6/00
See application file for complete search history.

(56) References Cited

FOREIGN PATENT DOCUMENTS

| | | | |
|---|---|---|---|
| JP | 2010054162 A | 3/2010 | |
| JP | 2016509147 A | 3/2016 | |
| JP | 2016102433 A | 6/2016 | |
| WO | 2014171067 A1 | 10/2014 | |
| WO | 2015/050269 A1 | 4/2015 | |
| WO | WO-2015050269 A1 * | 4/2015 | ............. C01G 23/04 |

* cited by examiner

S100 IS HEAT STORAGE MODE HISTORY PRESENT?
S102 CLOSE VALVE 56 AND ADJUST DISCHARGE PRESSURE OF WP 24 (< 60MPa)
S108 OPEN VALVE 56 AND ADJUST DISCHARGE PRESSURE OF WP 24 (< 60MPa)
S110 RECORD AS "PRESENCE" OF HEAT STORAGE MODE HISTORY
S112 ADJUST DISCHARGE PRESSURE OF WP 24 (> 60MPa)
S116 ADJUST DISCHARGE PRESSURE OF WP 24 (< 60MPa)
S118 RECORD AS "ABSENCE" OF HEAT STORAGE MODE HISTORY

S120 IS HEAT STORAGE MODE HISTORY PRESENT?
S122 CLOSE VALVE 56
S128 OPEN VALVE 56
S130 RECORD AS "PRESENCE" OF HEAT STORAGE MODE HISTORY
S132 CLOSE VALVE 66 AND START DRIVE OF WP 14
S134 Thw2 > T1 AFTER DETERMINATION TIME t?
S136 STOP DRIVE OF WP 14, OPEN VALVE 66 AND INHIBIT CONTROL OF VALVE 56
S138 OPEN VALVE 66
S142 STOP DRIVE OF WP 14
S144 RECORD AS "ABSENCE" OF HEAT STORAGE MODE HISTORY

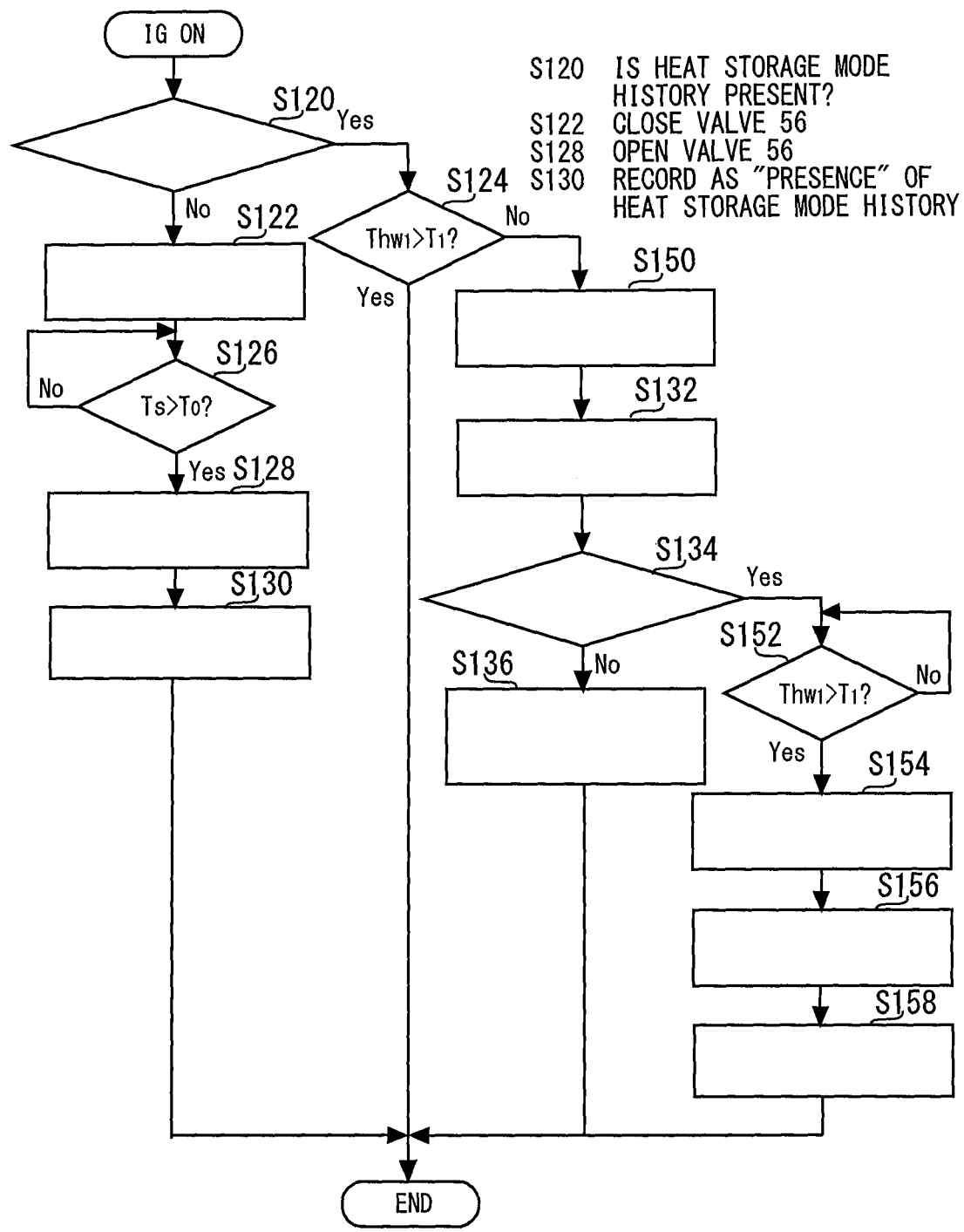

S120 IS HEAT STORAGE MODE HISTORY PRESENT?
S122 CLOSE VALVE 56
S128 OPEN VALVE 56
S130 RECORD AS "PRESENCE" OF HEAT STORAGE MODE HISTORY

S132 CLOSE VALVE 66 AND START DRIVE OF WP 14
S134 Thw2 > T1 AFTER DETERMINATION TIME t?
S136 STOP DRIVE OF WP 14, OPEN VALVE 66 AND INHIBIT CONTROL OF VALVE 56   S150 START FLOW STOP CONTROL
S154 END FLOW STOP CONTROL
S156 OPEN VALVE 66 AMD STOP DRIVE OF WP 14
S158 RECORD AS "ABSENCE" OF HEAT STORAGE MODE HISTORY

Fig. 12

S132 CLOSE VALVE 66 AND START DRIVE OF WP 14
S134 Thw2 > T1 AFTER DETERMINATION TIME t?
S136 STOP DRIVE OF WP 14, OPEN VALVE 66 AND
      INHIBIT CONTROL OF VALVE 56
S138 OPEN VALVE 66
S142 STOP DRIVE OF WP 14
S160 DIFFERENCE BETWEEN DETECTION VALUE AND REFERENCE VALUE < A0?
S162 CLOSE VALVE 56
S166 DIFFERENCE BETWEEN DETECTION VALUE AND REFERENCE VALUE < A0?
S168 CLOSE VALVE 56

INTERNAL COMBUSTION ENGINE

CROSS-REFERENCE TO RELATED APPLICATION

The present application claims priority under 35 U.S.C. § 119 to Japanese Patent Application No. 2016-113814, filed on Jun. 7, 2016. The contents of this application are incorporated herein by reference in their entirety.

BACKGROUND

Technical Field

The present disclosure relates to a heat storage and dissipation system for a vehicle.

Background Art

The present inventors have already disclosed in Patent Literature 1 (WO 2015/050269) and Non Patent Literature 1 (S Ohkoshi et al, "External stimulation-controllable heat-storage ceramics", Nature Communications 6, 2015, Article number: 7037, Doi: 10.1038/ncomms8037) a new type of titanium oxide (hereinafter also referred to as a "new titanium oxide") having a composition of $Ti_3O_5$, but having a crystal structure which is different from that of a known titanium oxide.

The crystal structure of the new titanium oxide makes phase transition into a monoclinic $\lambda$ phase having metallic properties in a temperature region lower than about 460 K. The crystal structure of the new titanium oxide further makes a characteristic phase. That is, when the phase of the crystal structure is a $\lambda$-phase, the $\lambda$-phase is kept even when the temperature of the new titanium oxide is lowered to below about 460 K. On the other hand, when a pressure higher than a predetermined pressure is applied to the new titanium oxide, the crystal structure makes phase transition into a $\beta$-phase from the $\lambda$-phase. Moreover, after the phase transition into the $\beta$-phase, when the temperature of the new titanium oxide is increased to a temperature higher than about 460 K, or when the new titanium oxide is irradiated with light for heat dissipation having a particular wavelength, crystal structure makes phase transition into the $\lambda$-phase from the $\beta$-phase.

In addition, the new titanium oxide exhibits interesting thermal properties during the phase transition. That is, the new titanium oxide releases heat outside during the phase transition from the $\lambda$-phase to the $\beta$-phase, whereas absorbs outside heat during the phase transition from the $\beta$-phase to the $\lambda$-phase. Patent Literature 1 discloses a heat storage and dissipation system for utilizing such thermal properties comprising: a heat storage apparatus that supplies heat to a heat storage/dissipation material in a liquid form; a heat dissipation apparatus that allows the heat storage/dissipation material to release heat to an engine utilizing the heat; and a flow channel connecting between the heat storage apparatus and the heat dissipation apparatus.

However, the heat storage and dissipation system disclosed in Patent Literature 1 is not intended for use in vehicles with an internal combustion engine. Therefore, there is still room to investigate specific configurations of the system in order to use the system for such vehicles.

The present disclosure addresses the above-described problem and has an object to provide a heat storage and dissipation system using the thermal properties of the new titanium oxide for vehicles with an internal combustion engine.

SUMMARY

The heat storage and dissipation system for a vehicle according to the present disclosure comprises: a circulation flow channel; a heat storage/dissipation material; and a pressure control section. In the circulation flow channel, a heat medium circulates while flowing through an internal combustion engine mounted on a vehicle and its related parts. The heat storage/dissipation material is provided at a place where heat exchange with the heat medium flowing in the circulation flow channel can be performed, and contains a titanium oxide having a composition of $Ti_3O_5$. The titanium oxide has the following properties: when being heated to a predetermined heat storage temperature or higher in a state where the phase of the crystal structure is the $\beta$-phase, the crystal structure makes the phase transition into the $\lambda$-phase to store outside heat; even when being cooled to below the heat storage temperature in a state where the phase of the crystal structure is the $\lambda$-phase, the crystal structure does not make the phase transition into the $\beta$-phase; and when a predetermined heat dissipation pressure or higher is applied to the titanium oxide, the crystal structure makes the phase transition into the $\beta$-phase from the $\lambda$-phase to release the heat to the outside. The pressure control section is configured to increase a pressure of the heat medium at an installation place of the heat storage/dissipation material, during the startup of the internal combustion engine, so that the heat storage/dissipation material receives from the heat medium flowing through the installation place a pressure higher than the heat dissipation pressure.

During the startup of the internal combustion engine, when the pressure of the heat medium at the installation place of the heat storage/dissipation material is increased so that the heat storage/dissipation material receives the heat dissipation pressure or higher from the heat medium during the startup of the internal combustion engine, the titanium oxide whose crystal structure is the $\lambda$-phase makes the phase transition into the $\beta$-phase from the $\lambda$-phase, and heat is transferred from the titanium oxide to the heat medium, thereby enabling the heat medium to be heated. The heated heat medium is circulated in the circulation flow channel, thereby enabling the internal combustion engine and its related parts to be heated.

The pressure control section may also be configured to decrease, after increasing the pressure of the heat medium of the heat medium at the installation place, the pressure of the heat medium at the installation place so that the pressure of the heat medium flowing through the installation place is below the heat dissipation pressure.

The phase transition of the titanium oxide into the $\beta$-phase from the $\lambda$-phase starts when the heat storage/dissipation material receives the heat dissipation pressure or higher from the heat medium flowing through the installation place. Since the phase transition into the $\beta$-phase from the $\lambda$-phase is completed in a short time, this phase transition is completed when the pressure of the heat medium flowing through the installation place becomes the heat dissipation pressure or higher, and then heat transfer from the titanium oxide to the heat medium occurs. Therefore, after increasing the pressure of the heat medium flowing through the installation place, when the pressure of the heat medium at the installation place is decreased so that the pressure of the meat medium flowing through the installation place is below the heat dissipation pressure, thereby enabling the energy required for the heat transfer from the titanium oxide to the heat medium to be suppressed.

The heat storage/dissipation material may be provided at a place where the heat generated in the internal combustion engine can be received. In this case, the pressure control section may also be configured to control the pressure of the heat medium at the installation place, when it is determined that the phase of the crystal structure is the β-phase, so that the pressure of the heat medium flowing through the installation place is below the heat dissipation pressure before increasing the pressure of the heat medium flowing through the installation place.

When it is determined that the phase of the crystal structure is the β-phase and also the pressure of the heat medium on the installation is controlled so that the pressure of the heat medium flowing through the installation place is below the heat dissipation pressure before increasing the pressure of the heat medium at the installation place, the heat generated in the internal combustion engine is transferred to the heat storage/dissipation material.

The heat storage/dissipation material may be incorporated in a heat storage/dissipation section which is provided in an exhaust passage of the internal combustion engine. In this case, the pressure control section may comprise: a pump on an engine outlet side; a control valve; and a pressure adjusting section. The pump on the engine outlet side is provided between a heat medium outlet of a water jacket of the internal combustion engine and a heat medium inlet of the heat storage/dissipation section in the circulation flow channel, and is configured to discharge the heat medium toward the heat medium inlet of the heat storage/dissipation section. The control valve may be provided between a heat medium outlet of the heat storage/dissipation section and a heat medium inlet of the water jacket in the circulation flow channel. The pressure adjusting section may be configured to adjust a pressure of the heat medium at the installation place by adjusting an opening degree of the control valve and a discharge pressure of the heat medium from the pump on the engine outlet side. Also, the pressure adjusting section may be configured to: adjust the discharge pressure constantly; adjust the opening degree of the control valve so as to increase that the pressure of the heat medium at the installation place by cutting off the flow of the heat medium from the heat medium outlet of the heat storage/dissipation section to the heat medium inlet of the water jacket; and adjust the opening degree of the control valve by releasing the control valve cutoff after increasing the pressure of the heat medium at the installation place.

When the pressure adjusting section adjusts the discharge pressure constantly while adjusting the opening degree of the control valve upon rising the pressure of the heat medium at the installation place so as to cut off the flow of the heat medium from the heat medium outlet of the heat storage/dissipation section to the heat medium inlet of the water jacket, heat from exhaust gas being stored in the heat storage/dissipation material is intensively transferred to the heat medium flowing between the pump on the engine outlet side and the control valve. After increasing the pressure of the heat medium at the installation place, when the pressure adjusting section adjusts the discharge pressure constantly while adjusting the opening degree of the control valve so as to release the control valve cutoff, the intensively heated heat medium flows on the downstream side of the control valve and then flows into the water jacket, thereby enabling the internal combustion engine to be heated.

When the pressure control section comprises the pump on the engine outlet side, the control valve and the pressure adjusting section, the pressure adjusting section may be configured to: adjust the opening degree so as to cut off the flow of the heat medium from the heat medium outlet of the heat storage/dissipation section to the heat medium inlet of the water jacket for a predetermined heat dissipation period, the heat dissipation period starts when it is determined that a temperature of the heat medium at the heat medium outlet of the water jacket is below a determination temperature; and adjust the opening degree so as to release the control valve cutoff when it is determined that the temperature of the heat medium at the installation place is increased to the determination temperature or higher by the end of the heat dissipation period.

When the flow of the heat medium from the heat medium outlet of the heat storage/dissipation section to the heat medium inlet of the water jacket is cut off for the heat dissipation period, the heat from exhaust gas is intensively transferred to the heat medium flowing between the pump on the engine outlet side and the control valve during the heat dissipation period. When it is determined that the temperature of the heat medium at the installation place is increased to the determination temperature or higher by the end of the heat dissipation period and also when the control valve cutoff is released, the heat medium heated to the determination temperature or higher flows on the downstream side of the control valve and flows into the water jacket, thereby enabling the internal combustion engine to be heated.

The system according to the present disclosure may comprise a pump on an engine inlet side and a discharge stopping section. The pump on the engine inlet side may be provided to the circulation flow channel and may be configured to discharge the heat medium toward the heat medium inlet of the water jacket. The discharge stopping section may be configured to stop the heat medium discharge from the pump on the engine inlet side temporarily until it is determined that the temperature of the heat medium at the heat medium outlet of the water jacket is increased to the determination temperature or higher during the startup of the internal combustion engine. In this case, the pressure adjusting section may also be configured to wait for the release of the control valve cutoff while the heat medium discharge from the pump on the engine inlet side is stopped by the discharge stopping section, even when it is determined that the temperature of the heat medium at the installation place is increased to the determination temperature or higher by the end of the heat dissipation period.

When the release of the control valve cutoff is waited for while the heat medium discharge from the pump on the engine inlet side is stopped by the discharge stopping section, the heat medium heated to the determination temperature or higher flows on the downstream side of the control valve and flows into the water jacket when the temporary stop of the heat medium discharge from the pump on the engine inlet side ends, thereby enabling the internal combustion engine to be heated.

When the pressure control section comprises the pump on the engine outlet side, the control valve and the pressure adjusting section, the pressure adjusting section may be also configured to: adjust the opening degree of the control valve so as to cut off the flow of the heat medium from the heat medium outlet of the heat storage/dissipation section to the heat medium inlet of the water jacket over a predetermined heat dissipation period from a time when it is determined that the temperature of the heat medium at the heat medium outlet of the water jacket is below a predetermined determination temperature; and determine that abnormality occurs in the heat storage/dissipation material when it is determined that the temperature of the heat medium at the installation place is not increased to the determination temperature or higher by the end of the heat dissipation period.

The heat storage/dissipation material may be incorporated in the water jacket of the internal combustion engine. In this case, the pressure control section may comprise a pump on an engine inlet side, a control valve and a pressure adjusting section. The pump on the engine inlet side may be configured to discharge the heat medium toward the heat medium inlet of the water jacket. The control valve may be provided at the heat medium outlet of the water jacket. The pressure adjusting section may be configured to adjust a pressure of the heat medium at the installation place by adjusting an opening degree of the control valve and a discharge pressure of the heat medium from the pump on the engine inlet side. Also, the pressure adjusting section may be configured to: adjust the discharge pressure constantly; adjust the opening degree of the control valve so as to increase that the pressure of the heat medium at the installation place by cutting off the flow of the heat medium to the downstream side of the control valve; and adjust the opening degree of the control valve by releasing the control valve cutoff after increasing the pressure of the heat medium at the installation place.

When the pressure adjusting section adjusts the discharge pressure constantly while adjusting the opening degree of the control valve upon rising the pressure of the heat medium at the installation place so as to cut off the flow of the heat medium to the downstream side of the control valve, heat from exhaust gas being stored in the heat storage/dissipation material is intensively transferred to the heat medium flowing through the water jacket, thereby enabling the internal combustion engine to be heated. After increasing the pressure of the heat medium at the installation place, when the pressure adjusting section adjusts the discharge pressure constantly while adjusting the opening degree of the control valve so as to release the control valve cutoff, the intensively heated heat medium flows into the downstream side of the control valve, thereby enabling the related parts of the internal combustion engine to be heated.

The heat storage/dissipation material may comprise a first heat storage/dissipation material which is incorporated in the heat storage/dissipation section provided in the exhaust passage of the internal combustion engine and a second storage/dissipation material which is incorporated in the water jacket of the internal combustion engine. In this case, the pressure control section may comprise a pump on an engine outlet side, a first control valve, a first pressure adjusting section, a pump on an engine inlet side, a second control valve and a second pressure adjusting section. The pump on the engine outlet side may be provided between a heat medium outlet of a water jacket of the internal combustion engine and a heat medium inlet of the heat storage/dissipation section in the circulation flow channel, and may be configured to discharge the heat medium toward the heat medium inlet of the heat storage/dissipation section. The first control valve may be provided between a heat medium outlet of the heat storage/dissipation section and a heat medium inlet of the water jacket in the circulation flow channel. The first pressure adjusting section may be configured to adjust a first pressure of the heat medium at an installation place of the first heat storage/dissipation material by adjusting an opening degree of the first control valve and a first discharge pressure of the heat medium from the pump on the engine outlet side. The pump on the engine inlet side may be configured to discharge the heat medium toward the heat medium inlet of the water jacket. The second control valve may be provided at the heat medium outlet of the water jacket. The second pressure adjusting section may be configured to adjust a second pressure of the heat medium at an installation place of the second heat storage/dissipation material by adjusting an opening degree of the second control valve and a second discharge pressure of the heat medium from the pump on the engine inlet side. The first pressure adjusting section may also be configured to: adjust the first discharge pressure constantly; adjust the opening degree of the first control valve upon rising the pressure of the heat medium at the installation place of the first heat storage/dissipation material so as to cut off the flow of the heat medium from the heat medium outlet of the heat storage/dissipation section to the heat medium inlet of the water jacket; and after increasing the pressure of the heat medium at the installation place of the first heat storage/dissipation material, adjust the opening degree of the first control valve so as to release the first control valve cutoff The second pressure adjusting section may also be configured to: adjust the discharge pressure constantly; adjust the opening degree of the second control valve so as to increase that the pressure of the heat medium at the installation place of the second heat storage/dissipation material by cutting off the flow of the heat medium to the downstream side of the second control valve; and after increasing the pressure of the heat medium at the installation place of the second heat storage/dissipation material, adjust the opening degree of the second control valve by releasing the second control valve cutoff.

According to the heat storage and dissipation system for a vehicle according to the present disclosure, a heat storage and dissipation system using the thermal properties of the new titanium oxide can be provided for vehicles with an internal combustion engine.

BRIEF DESCRIPTION OF DRAWINGS

FIG. 12 is a flowchart illustrating an example of processing executed by the ECU 60 in a fourth embodiment of the present disclosure;

DESCRIPTION OF EMBODIMENTS

In the following, embodiments of the present disclosure are described with reference to the drawings. Elements common to each figure are attached with the same reference signs to omit duplicated descriptions. However, the following embodiments do not limit the present disclosure.

First Embodiment

A first embodiment of the present disclosure is described with referent to FIGS. 1 to 7.

[Description of Configuration of Heat Storage and Dissipation System]

Figure 1:
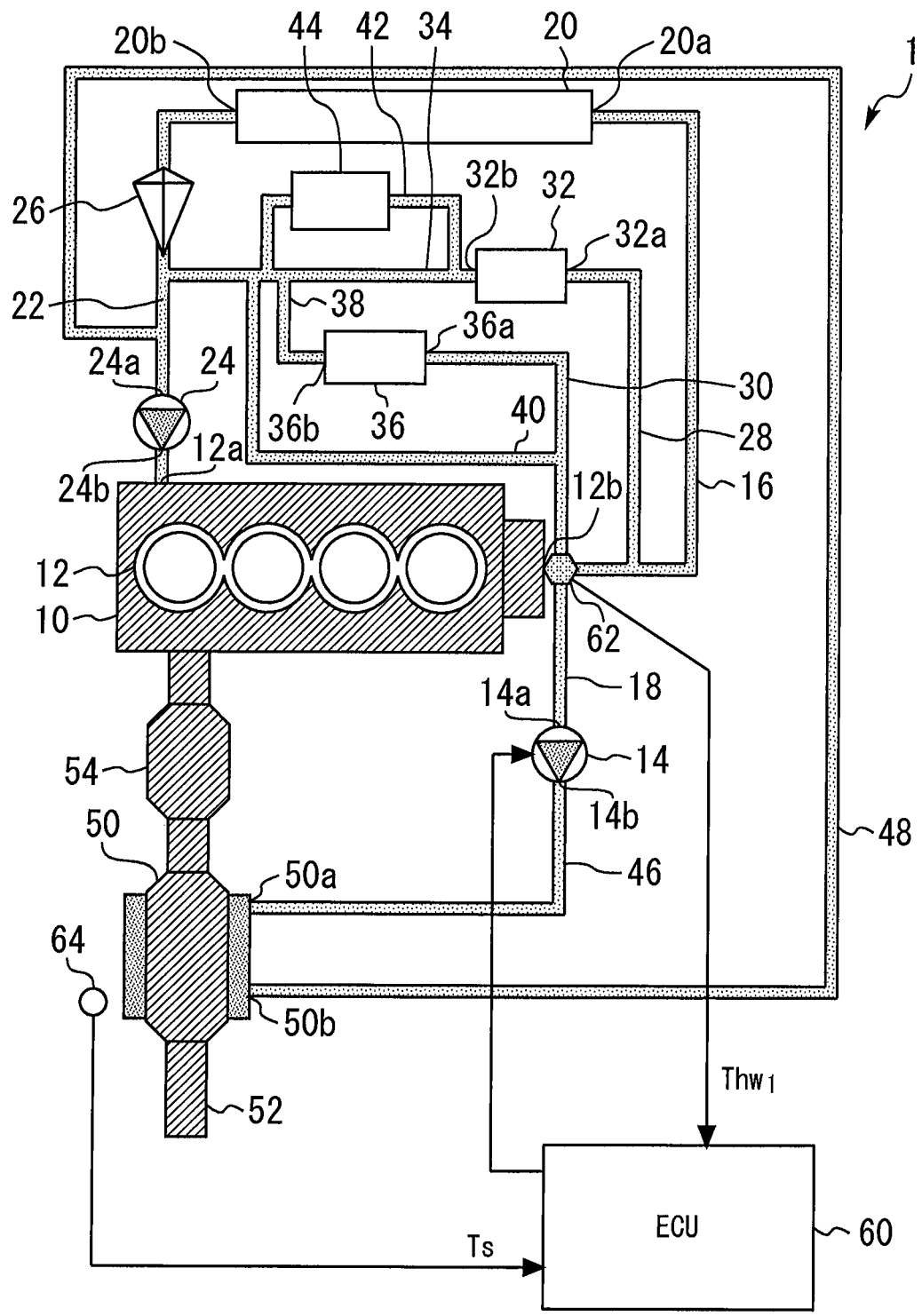
FIG. 1 is a schematic diagram illustrating an entire configuration of a heat storage and dissipation system according to a first embodiment of the present disclosure.

FIG. 1 is a schematic diagram illustrating an entire configuration of a heat storage and dissipation system according to the first embodiment of the present disclosure. A heat storage and dissipation system 1 illustrated in FIG. 1 is mounted in a vehicle, and comprises an in-line four-cylinder internal combustion engine 10 as a power source of the vehicle. However, the number of cylinders and the cylinder arrangement of the internal combustion engine 10 are not limited to four and in-line arrangement, respectively. A combustion system of the internal combustion engine 10 is not limited to a particular combustion system.

A water jacket 12 for flowing coolant (heat medium) is formed in a main body (cylinder block and cylinder head) of the internal combustion engine 10. When the coolant flows through the water jacket 12, heat is exchanged between the coolant and the internal combustion engine 10.

A flow channel 16 connects between a coolant outlet 12b of the water jacket 12 and a coolant inlet 20a of a radiator 20. When the coolant flows inside of the radiator 20, heat is exchanged between outside air and the coolant. A coolant outlet 20b of the radiator 20 is connected to a coolant inlet 24a of a mechanical type WP 24 through a flow channel 22. The mechanical type WP 24 is a water pump driven by a driving force of the internal combustion engine 10 transmitted thereto through a belt. A coolant outlet 24b of the mechanical type WP 24 is connected to a coolant inlet 12a of the water jacket 12.

A thermostat 26 is provided in the middle of the flow channel 22. The thermostat 26 is an apparatus for controlling a valve driven by using thermowax as a driving source, for example, the thermowax being expanded and contracted depending on the level of the temperature of the coolant. More particularly, when the temperature of the coolant flowing into the thermostat 26 is relatively low (e.g., when the temperature of the coolant is under 80° C.), the thermostat 26 drives the valve so that the coolant flowing out from the radiator 20 through the coolant outlet 20b does not flow into the coolant inlet 24a. When the temperature of the coolant flowing into the thermostat 26 is relatively high (e.g., when the temperature of the coolant is 80° C. or higher), the thermostat 26 drives the valve so that the coolant flowing out from the radiator 20 through the coolant outlet 20b flows into the coolant inlet 24a.

A flow channel 18 is connected to the middle of the flow channel 16. An electric type WP 14 is provided to the flow channel 18. The electric type WP 14 is a water pump including an impeller which sends the coolant by its rotation, and a motor which rotates the impeller. The rotation of the motor is electrically controlled, thereby enabling a pressure of the coolant discharged from the electric type WP 14 (hereinafter also referred to as a "discharge pressure of the coolant from the electric type WP 14") to be changed.

The water jacket 12 and the flow channels 16, 18, 22 constitute a portion of a coolant circulation flow channel included in the heat storage and dissipation system 1. Other flow channels constituting the coolant circulation flow channel include flow channels 28, 30. Both of the flow channels 28, 30 branch off from the middle of the flow channel 16 in the same manner as the flow channel 18. The flow channel 28 is connected to a coolant inlet 32a of a heater 32. When the coolant flows inside of the heater 32, heat is exchanged between air for heating a vehicle compartment and the coolant. A coolant outlet 32b of the heater 32 is connected to the flow channel 22 at a downstream side of the thermostat 26 through the flow channel 34.

The flow channel 30 is connected to a coolant inlet 36a of a throttle body 36. When the coolant flows inside of the throttle body 36, heat is exchanged between the coolant and the throttle body 36. A coolant outlet 36b of the throttle body 36 is connected to the flow channel 34 at a downstream side of the heater 32 through a flow channel 38. A flow channel 40 connects between the middle of the flow channel 30 and the flow channel 34 at the downstream side of the heater 32 by bypassing the throttle body 36. A flow channel 42 connects to the middle of the flow channel 34 to bypass a portion of the flow channel 34. A CVT (Continuously Variable Transmission) warmer 44 is provided in the middle of the flow channel 42. When the coolant flows inside of the CVT warmer 44, heat is exchanged between the coolant and lubricant for operating the CVT which is connected to an output shaft of the internal combustion engine 10.

Other flow channels constituting the coolant circulation flow channel further include flow channels 46, 48. The flow channel 46 connects between a coolant outlet 14b of the electric type WP 14 and a coolant inlet 50a of a waste heat recovery and dissipation apparatus 50. The flow channel 48 connects between the flow channel 22 and the coolant outlet 50b of the waste heat recovery and dissipation apparatus 50. In the flow channel 22, a place where the flow channel 48 is connected to the flow channel 22 is positioned on the downstream side of a place where the flow channel 34 is connected to the flow channel 22. The waste heat recovery and dissipation apparatus 50 is provided to an exhaust passage 52 of the internal combustion engine 10. In the exhaust passage 52, a place where the waste heat recovery and dissipation apparatus 50 is provided is positioned on the downstream side of a place where a catalyst 54 (a three-way catalyst as an example) is provided. The waste heat recovery and dissipation apparatus 50 incorporates a heat storage/dissipation material (to be described later), the heat storage/dissipation material being heat-exchangeable with the exhaust gas and the coolant. A configuration of the waste heat recovery and dissipation apparatus 50 and the heat exchange in the waste heat recovery and dissipation apparatus 50 are described later.

The heat storage and dissipation system 1 illustrated in FIG. 1 further includes an ECU (Electronic Control Unit) 60. The ECU 60 includes at least an input/output interface, a memory, and a CPU. The input/output interface is provided for taking in sensor signals from various sensors and outputting an operation signal to an actuator. The sensors from which the ECU 60 takes in signals include at least a temperature sensor 62 provided to the flow channel 16 in the vicinity of the coolant outlet 12b, and a temperature sensor 64 provided to the waste heat recovery and dissipation apparatus 50. The temperature sensor 62 detects a temperature $Thw_1$ of the coolant in the vicinity of the coolant outlet 12b. The temperature sensor 64 detects a temperature Ts of the heat storage/dissipation material incorporated in the waste heat recovery and dissipation apparatus 50. The actuator to which the ECU 60 outputs the operation signal includes at least the motor of the electric type WP 14 described above. The memory stores a control program defining heat storage and dissipation routines (to be described later), various maps, and the like. The CPU reads out a control program and the like from the memory and executes the readout program, and then generates an operation signal based on the received sensor signal.

Figure 2:
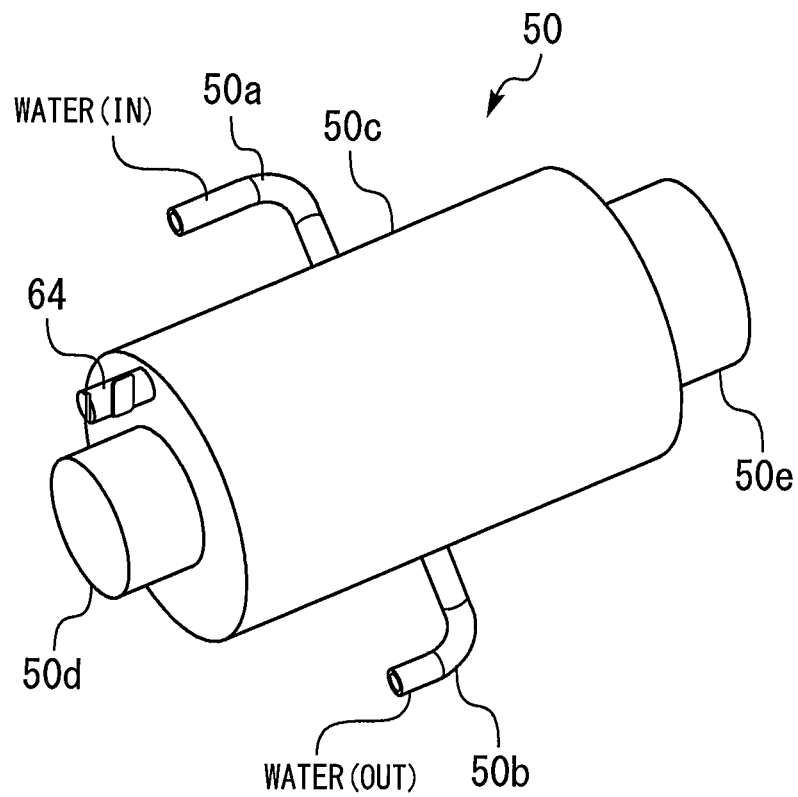
FIG. 2 is a perspective view of a waste heat recovery and dissipation apparatus 50 illustrated in FIG. 1.
Figure 3:
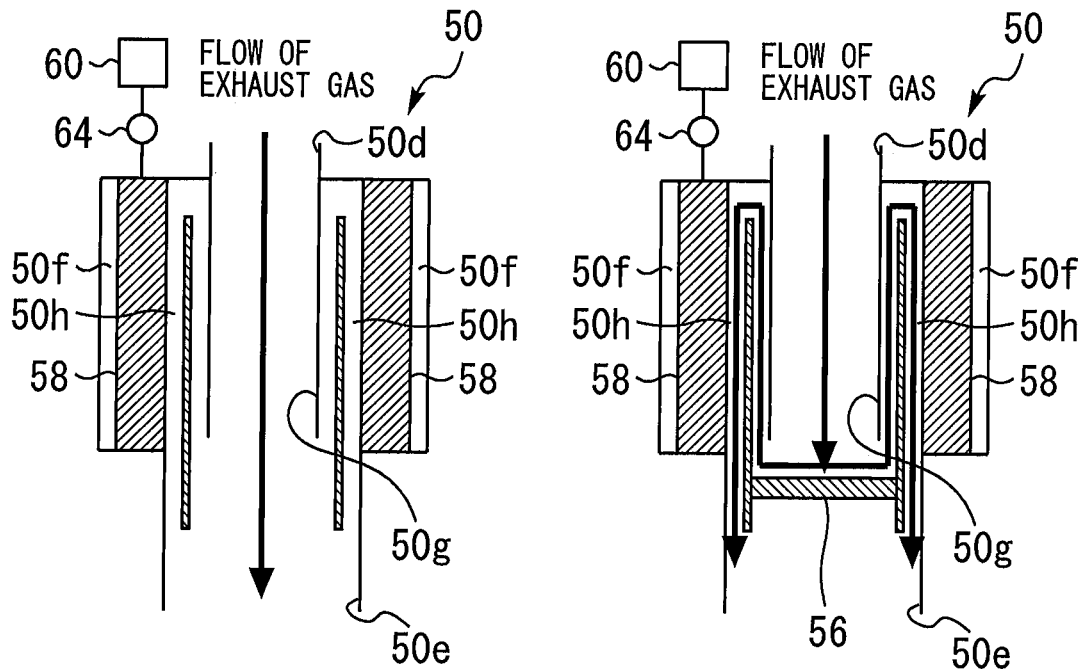
FIG. 3 is a cross-sectional view of the waste heat recovery and dissipation apparatus 50 illustrated in FIG. 1.

FIG. 2 is a perspective view of the waste heat recovery and dissipation apparatus 50 illustrated in FIG. 1. FIG. 3 is a cross-sectional view of the waste heat recovery and dissipation apparatus 50 illustrated in FIG. 1. As illustrated in FIG. 2, the waste heat recovery and dissipation apparatus 50 includes: a cylindrical main body 50c, and a gas inlet 50d and a gas outlet 50e which are provided at both ends in a central axis direction of the main body 50c. The coolant inlet 50a and the coolant outlet 50b (which are described above) are provided on a side surface in a peripheral direction of the main body 50c. As illustrated in FIG. 3, a flow channel 50f, a gas flow channel 50g and a gas flow channel 50h are formed in the waste heat recovery and dissipation apparatus 50. The flow channel 50f connects between the coolant inlet 50a and the coolant outlet 50b illustrated in FIG. 2. The gas flow channel 50g connects between the gas inlet 50d and the gas outlet 50e. The gas flow channel 50g connects between the gas inlet 50d and the gas outlet 50e.

As illustrated in the right side of FIG. 3, an electromagnetic valve 56 is provided on a flow channel wall of the gas flow channel 50h. The electromagnetic valve 56 is a normal open valve, and is included in the actuator to which the ECU 60 outputs the operation signal. The left side of FIG. 3 illustrates a state where the electromagnetic valve 56 is opened. As illustrated in the left side of FIG. 3, when the electromagnetic valve 56 is in an opened state, exhaust gas flows in from the gas inlet 50d, and flows through the gas flow channel 50g toward the gas outlet 50e. On the other hand, the right side of FIG. 3 illustrates a state where the electromagnetic valve 56 is closed. As illustrated in the right side of FIG. 3, when the electromagnetic valve 56 is in a closed state, the exhaust gas flows in from the gas inlet 50d, flows through the gas flow channel 50g into the gas flow channel 50h, and then flows toward the gas outlet 50e.

As illustrated in FIG. 3, a heat storage/dissipation material 58 is provided inside of the waste heat recovery and dissipation apparatus 50. The heat storage/dissipation material 58 is provided so as to be heat-exchangeable with the coolant flowing through the flow channel 50f and the exhaust gas flowing through the flow channel 50h, and contains the new titanium oxide described above. The heat storage/dissipation material 58 can release heat to the coolant flowing through the flow channel 50f, or receive heat from the exhaust gas flowing through the flow channel 50h, according to a crystal structure of the new titanium oxide.

[Crystal Structure and Thermal Properties of New Titanium Oxide]

Figure 4:
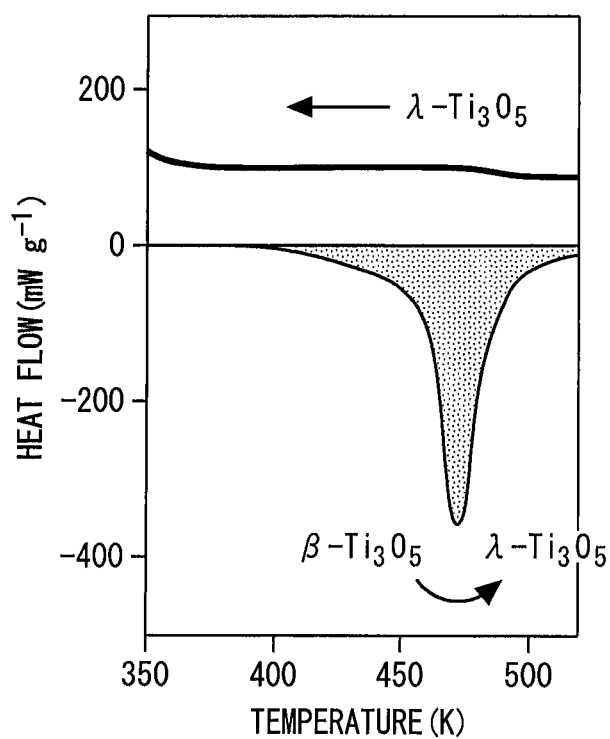
FIG. 4 is a graph showing change in heat flow when a temperature of a new titanium oxide is changed.
Figure 5:
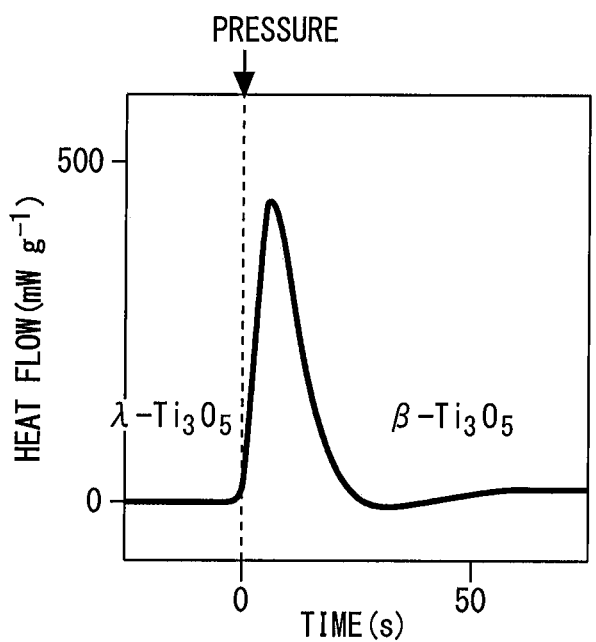
FIG. 5 is a graph showing change in heat flow when a pressure of about 60 MPa is applied to the new titanium oxide whose crystal structure is a λ-phase at a normal temperature.

The crystal structure and thermal properties of the new titanium oxide are simply described with referent to FIGS. 4 and 5. FIG. 4 is a graph showing change in heat flow when a temperature of the new titanium oxide is changed. The new titanium oxide is obtained by a phase transition of the crystal structure between a β-phase having semiconductor properties and a monoclinic λ phase having metallic properties. As understood from FIG. 4, when the temperature of the new titanium oxide whose crystal structure is the β-phase (β-$Ti_3O_5$) is increased, the new titanium oxide makes the phase transition of the crystal structure into the λ-phase at about 460 K, and stores outside heat. On the other hand, when the temperature of the new titanium oxide whose crystal structure is the λ-phase (λ-$Ti_3O_5$) is lowered, the λ-phase is maintained even when the temperature of the new titanium oxide is lowered to a temperature lower than about 460 K, and the new titanium oxide does not release the heat to the outside.

FIG. 5 is a graph showing change in heat flow when a pressure of about 60 MPa is applied to the new titanium oxide whose crystal structure is the λ-phase at a normal temperature. Note that the pressure is applied at a time t=0. As understood from FIG. 5, when the pressure of about 60 MPa is applied to the new titanium oxide whose crystal structure is the λ-phase (λ-$Ti_3O_5$) at a normal temperature, the new titanium oxide makes the phase transition of the crystal structure into the β-phase, and releases the heat to the outside. Thus, when once the phase of the crystal structure changes to the λ-phase, the new titanium oxide exhibits interesting thermal properties of not releasing the heat to the outside even when the temperature is lowered and of releasing the heat to the outside only when the pressure of about 60 MPa is applied. The details of the crystal structure and the thermal properties of the new titanium oxide described here are disclosed in Patent Literature 1 and Non Patent Literature 1.

In consideration of the descriptions of FIGS. 4 and 5, it is found that the heat storage/dissipation material 58 illustrated in FIG. 3 causes the following heat transfer to occur according to the crystal structure of the new titanium oxide. That is, when a pressure received by the heat storage/dissipation material 58 from the coolant flowing through the flow channel 50f is increased to a predetermined pressure PHR (about 60 MPa) or higher in a state where the phase of the crystal structure is the λ-phase, the heat stored in the heat storage/dissipation material 58 is released to the coolant. When a temperature of the heat storage/dissipation material 58 is increased to a predetermined temperature THS (about 460 K) or higher by the heat of the exhaust gas flowing the gas flow channel 50h in a state where the phase of the crystal structure is the β-phase, the heat of the exhaust gas is stored in the heat storage/dissipation material 58.

[Heat Storage and Dissipation Operations in First Embodiment]

In the present embodiment, the ECU 60 controls a pressure of the coolant discharged from the electric type WP 14 illustrated in FIG. 1, and an opening/closing state of the electromagnetic valve 56 illustrated in FIG. 3, so that using the thermal properties of the new titanium oxide described above allows the heat storage/dissipation material 58 illustrated in FIG. 3 to perform a heat storage operation and a heat dissipation operation during the startup of the internal combustion engine 10.

Specifically, the discharge pressure from the electric type WP 14 is controlled as follows. That is, in order to cause the heat storage/dissipation material 58 to perform the heat storage operation, the pressure of the coolant discharged from the electric type WP 14 is adjusted so that the pressure in the coolant circulation flow channel (more precisely, a pressure in the flow channel 50f) is below the pressure PHR. In order to make the heat storage/dissipation material 58 perform the heat dissipation operation, the pressure of the coolant discharged from the electric type WP 14 is adjusted so that the pressure in the coolant circulation flow channel is the pressure PHR or higher.

Specifically, the opening/closing state of the electromagnetic valve 56 is controlled as follows. That is, in order to cause the heat storage/dissipation material 58 to perform the heat storage operation, the electromagnetic valve 56 is controlled to be in the closed state. Even immediately after the internal combustion engine 10 starts, the temperature of the exhaust gas discharged from the internal combustion engine 10 becomes higher than about 460 K (about 187° C.). When the electromagnetic valve 56 is controlled to be in the closed state, the temperature of the heat storage/dissipation material 58 is increased to the temperature THS or higher by the heat of the exhaust gas. Since the electromagnetic valve 56 is a normal open valve, in order to cause the heat storage/dissipation material 58 to perform the heat dissipation operation, the electromagnetic valve 56 need not be controlled.

Figure 6:
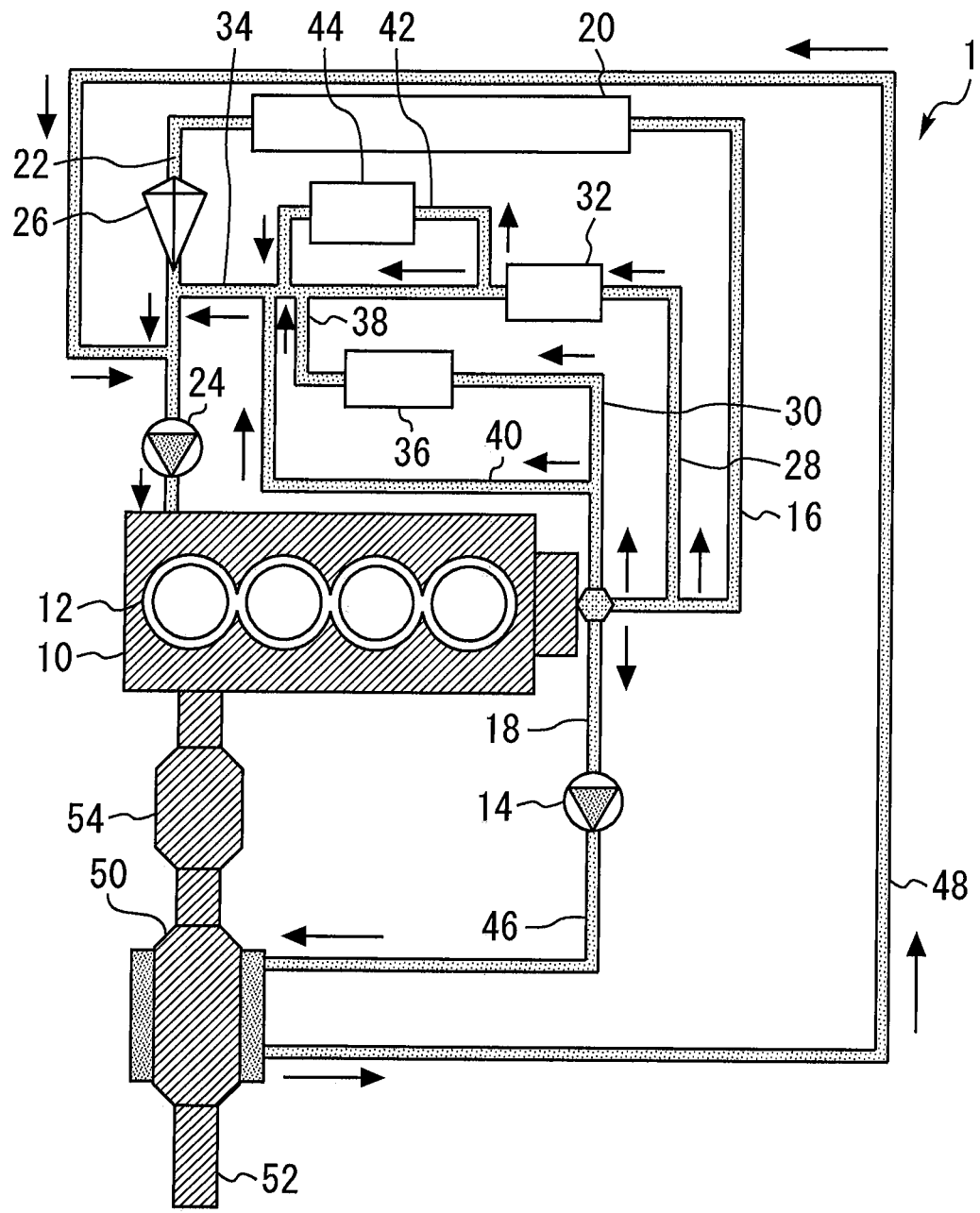
FIG. 6 is a diagram for explaining a flow of coolant during the startup of an internal combustion engine 10.

FIG. 6 is a diagram for explaining a flow of the coolant during the startup of the internal combustion engine 10. During the startup of the internal combustion engine 10, the coolant heated by receiving the heat from the heat storage/dissipation material 58 flows through the flow channel 48 and the flow channel 22 in this order, and then flows into the water jacket 12 by drive of the mechanical type WP 24. The coolant discharged from the water jacket 12 to the flow channel 16 flows into any of the flow channels 18, 28, and 30. The coolant flowing into the flow channel 18 is sent to the electric type WP 14. The coolant flowing into the flow channel 28 flows through the heater 32, the flow channel 42, the CVT warmer 44 (or the flow channel 34), and the flow channel 22 in this order, and is sent to the mechanical type WP 24. The coolant flowing into the flow channel 30 flows through the flow channel 38 (or the flow channel 40) and the flow channel 22 in this order, and is sent to the mechanical type WP 24.

[Specific Processing in First Embodiment]

Figure 7:
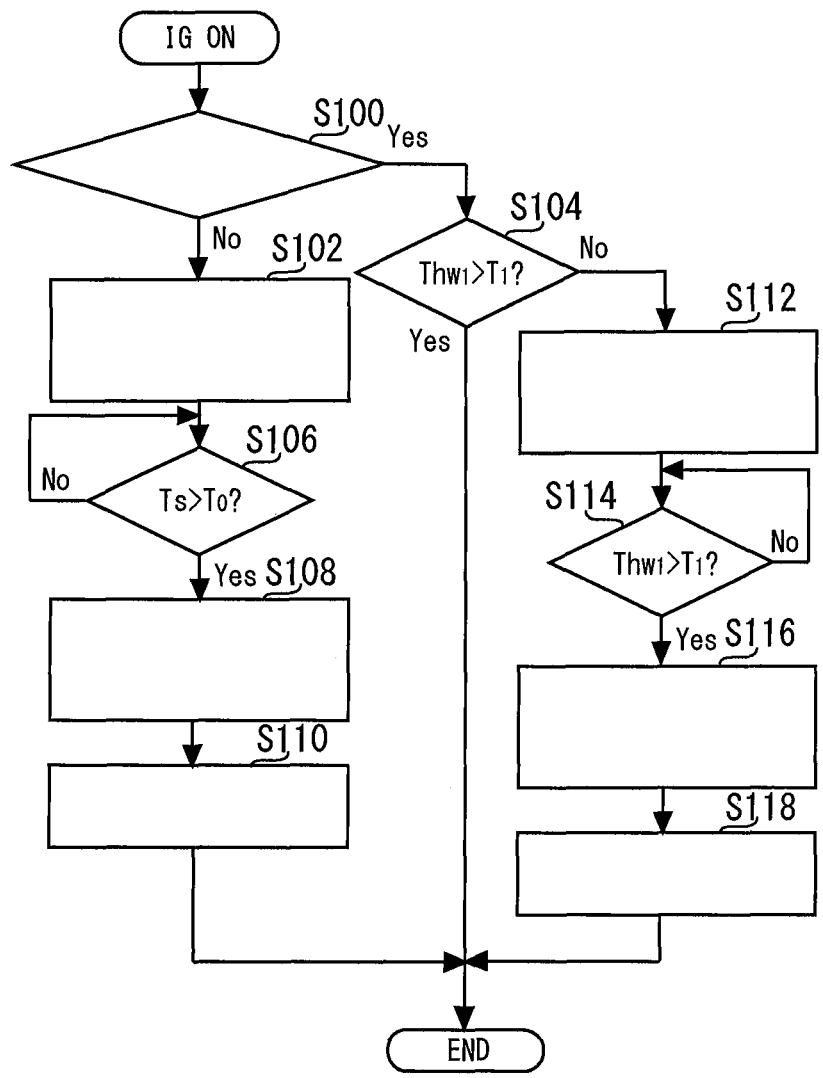
FIG. 7 is a flowchart illustrating an example of processing executed by an ECU 60 in a first embodiment of the present disclosure.

FIG. 7 is a flowchart illustrating an example of processing executed by the ECU 60 in the first embodiment of the present disclosure. Note that routines (heat storage and dissipation routines) shown in this figure are repeatedly performed at each predetermined control cycle after predetermined operations (e.g., turning an ignition key to a predetermined position, and the like) are performed by a driver of the vehicle and the ignition is turned on (IG ON).

In the routines illustrated in FIG. 7, firstly, it is determined whether a heat storage mode history is present (step S100). The heat storage mode history is recorded as "presence" in the memory of the ECU 60 when the above-described heat storage operation of the heat storage/dissipation material 58 is completed. In this step, the ECU 60 retrieves the presence or absence of the heat storage mode history in the memory. When a result is determined as "absence" of the heat storage mode history (in the case of "No"), the phase of the crystal structure of the new titanium oxide contained in the heat storage/dissipation material 58 can be determined to be β-phase, then the routine proceeds to step S102. On the other hand, when a result is determined as "presence" of the heat storage mode history (in the case of "Yes"), the phase of the crystal structure can be determined to be the λ-phase, then the routine proceeds to step S104.

In step S102, in order to cause the heat storage/dissipation material 58 to perform the heat storage operation, the electromagnetic valve 56 is closed and the pressure of the coolant discharged from the electric type WP 14 is adjusted so that the pressure in the flow channel 50f is below the pressure PHR. Then, it is determined whether $Ts>T_0$ is satisfied, where Ts and $T_0$ are a temperature and a threshold value of the heat storage/dissipation material 58, respectively (step S106). In step S106, the ECU 60 acquires the temperature Ts from the temperature sensor 64, and compares it with the threshold value $T_0$. However, the threshold value $T_0$ is the temperature THS or higher and is preset. As a result of comparison, when it is determined that $Ts>T_0$ is not satisfied (in the case of "No"), the ECU 60 returns to step S106. That is, the processing in step S106 is repeated until it is determined in step S106 that $Ts>T_0$ is satisfied.

When determining in step S106 that $Ts>T_0$ is satisfied (in the case of "Yes"), the ECU 60 can determine that the new titanium oxide contained in the heat storage/dissipation material 58 makes the phase transition of the crystal structure into the λ-phase from the β-phase, and proceeds to step S108. In step S108, the electromagnetic valve 56 is returned to the opened state. Note that the pressure of the coolant discharged from the electric type WP 14 continues to be adjusted so that the pressure in the flow channel 50f is below the pressure PHR. Then, the heat storage mode history is recorded as "presence" in the memory of the ECU 60 (step S110).

In step S104, it is determined whether $Thw_1>T_1$ is satisfied, where $Thw_1$ and $T_1$ are a temperature and a threshold value of the coolant in the vicinity of the coolant outlet 12b, respectively. However, the threshold value $T_1$ is the temperature at which it can be determined that warming-up of the internal combustion engine 10 is completed (e.g., 80° C.), and is preset. As a result of comparison, when determining that $Thw_1>T_1$ is satisfied (in the case of "Yes"), the ECU 60 can determine that the heat dissipation operation of the heat storage/dissipation material 58 is not necessary to be performed, and ends this routine. On the other hand, when determining that $Thw_1>T_1$ is not satisfied (in the case of "No"), the ECU 60 can determine that the internal combustion engine 10 needs to be heated. In order to cause the heat storage/dissipation material 58 to perform the heat dissipation operation, the pressure of the coolant discharged from the electric type WP 14 is adjusted so that the pressure in the flow channel 50f is the pressure PHR or higher (step S112).

Subsequently to step S112, it is determined again whether the temperature $Thw_1$ and the threshold value $T_1$ satisfy the relation: $Thw_1>T_1$ (step S114). The processing in this step is the same as the processing in step S104. As a result of comparison between the temperature $Thw_1$ and the threshold value $T_1$, when determining that $Thw_1>T_1$ is not satisfied (in the case of "No"), the ECU 60 returns to step S114. That is, the processing in step S114 is repeated until it is determined that $Thw_1>T_1$ is satisfied.

When determining in step S114 that $Thw_1>T_1$ is satisfied (in the case of "Yes"), the ECU 60 can determine that warming-up of the internal combustion engine 10 is completed, and proceeds step S116. In step S116, the pressure of the coolant discharged from the electric type WP 14 is adjusted so that the pressure in the flow channel 50f is below the pressure PHR. Then, the heat storage mode history is recorded as "absence" in the memory of the ECU 60 (step S118).

According to the routines illustrated in FIG. 7, the heat storage/dissipation material 58 can perform the heat storage operation or the heat dissipation operation according to the presence/absence of the heat storage mode and the magnitude relation between the temperature $Thw_1$ and the threshold value $T_1$. In the other words, the heat of the exhaust gas stored in the heat storage/dissipation material 58 at any timing during normal operation of the internal combustion engine 10 is stored and also released, without wasting it, from the heat storage/dissipation material 58 during the startup of the internal combustion engine, thereby enabling the internal combustion engine 10, the heater 32, a throttle body 36 and the like to be heated.

In the above first embodiment, the heater 32, the throttle body 36 and the CVT warmer 44 are equivalent to the "related parts" of the present disclosure, and the waste heat recovery and dissipation apparatus 50 is equivalent to the "heat storage/dissipation section" of the present disclosure.

The "pressure control section" of the present disclosure is realized by executing the processing in step S112 by the ECU 60 in FIG. 7.

In the above first embodiment, when it is determined that $Thw_1 > T_1$ is satisfied in step S114 in FIG. 7, the processing in step S116 is executed. However, the processing in step S114 may be skipped to execute the processing in step S116 after the processing in step S112. Since the phase transition of the crystal structure of the new titanium oxide into the β-phase from the λ-phase is completed in a short time, the phase transition is basically completed immediately after the pressure in the flow channel 50f is increased to the pressure PHR or higher by the processing in step S112 in FIG. 7, thereby causing the heat transfer from the new titanium oxide to the coolant. Even when the processing in step S116 is executed after the processing in step S112, the heat transfer from the new titanium oxide to the coolant occurs, thereby enabling the internal combustion engine to be warmed up. Note that when the processing in step S114 is skipped, the energy required for the heat transfer from the new titanium oxide to the coolant (i.e., the energy required for driving the electric type WP 14) can be suppressed as compared with a case for performing the processing in step S114.

Second Embodiment

Figure 8:
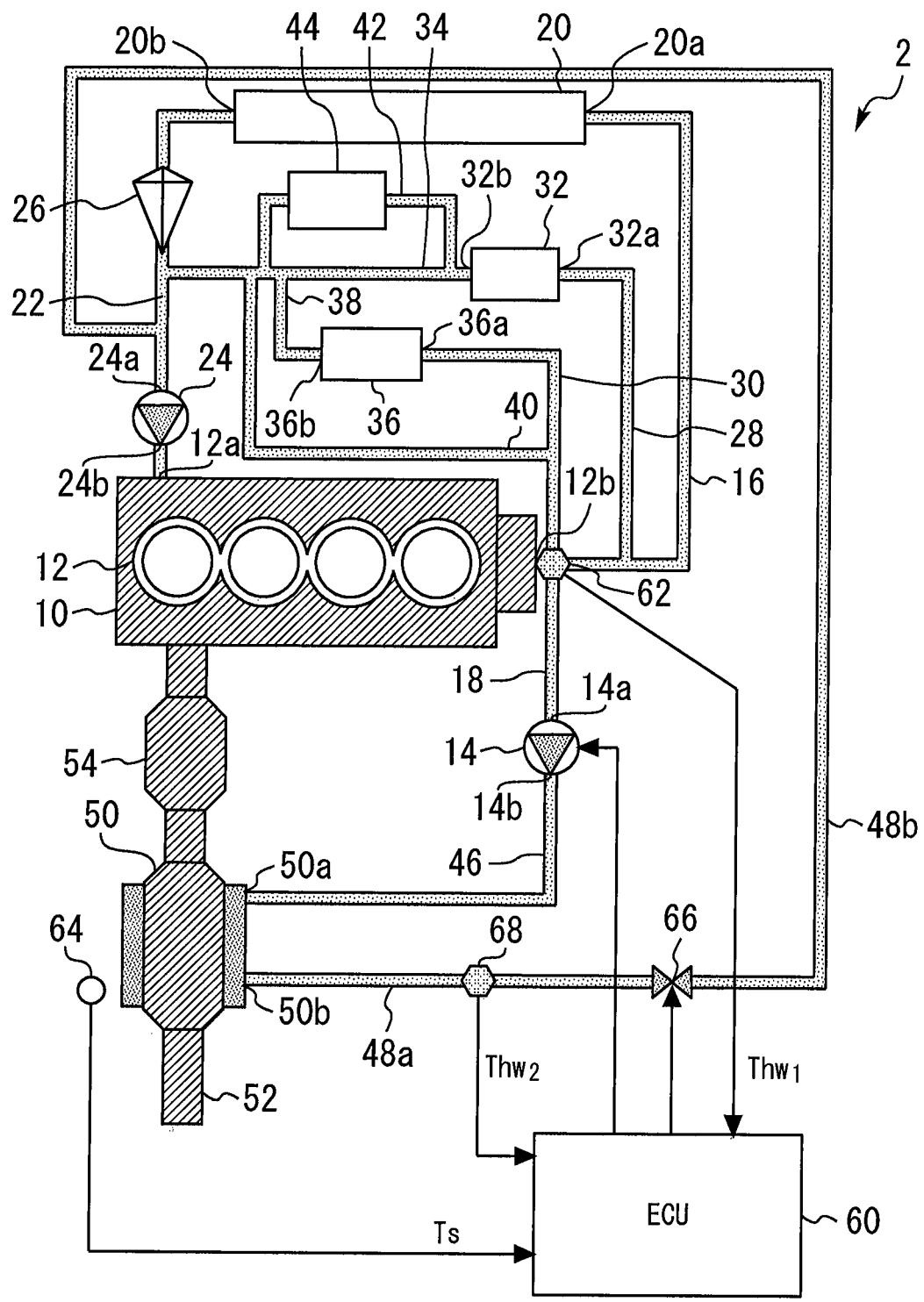
FIG. 8 is a schematic view illustrating an entire configuration of a heat storage and dissipation system according to a second embodiment of the present disclosure.
Figure 9:
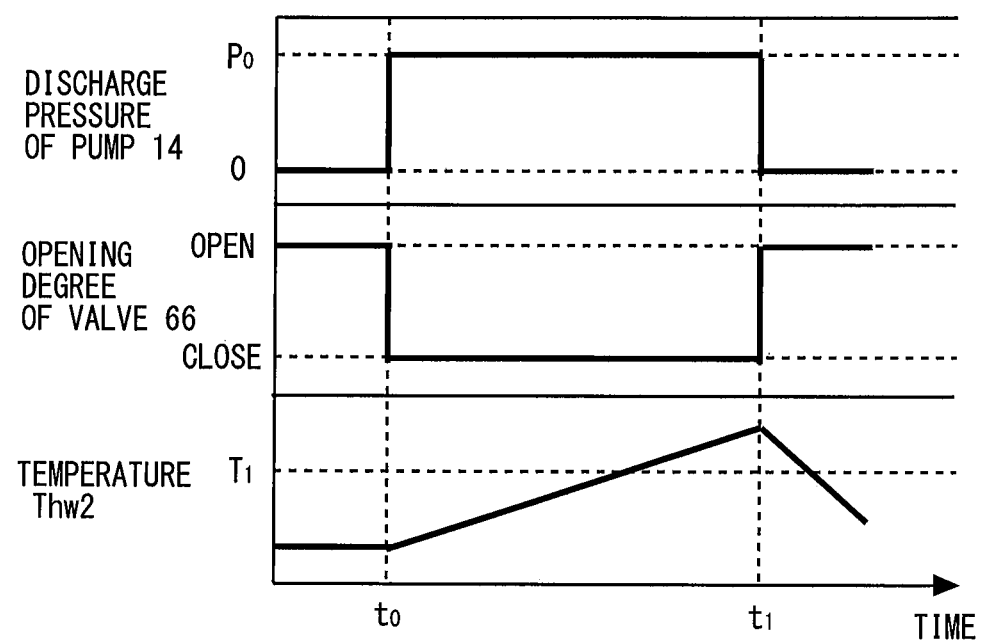
FIG. 9 is a timing chart for explaining a control outline in a case of causing a heat storage/dissipation material 58 to perform a heat dissipation operation in the second embodiment of the present disclosure.
Figure 10:
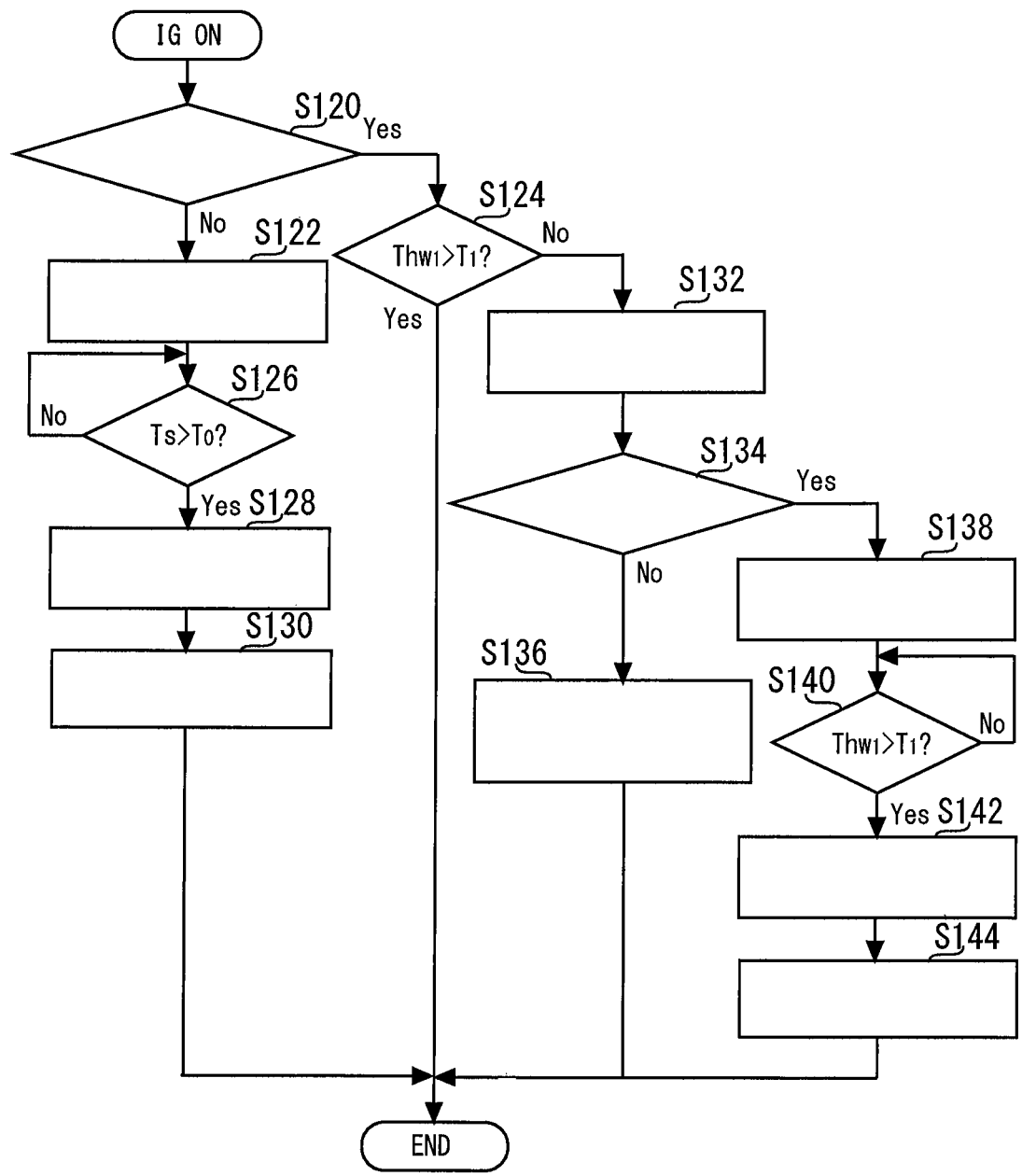
FIG. 10 is a flowchart illustrating an example of processing executed by the ECU 60 in the second embodiment of the present disclosure.

A second embodiment of the present disclosure is described with referent to FIGS. 8 to 10.

[Description of Configuration of Heat Storage and Dissipation System]

FIG. 8 is a schematic view illustrating an entire configuration of a heat storage and dissipation system according to the second embodiment of the present disclosure. A heat storage and dissipation system 2 illustrated in FIG. 8 is mounted in a vehicle, and a basic configuration thereof is common to that of the heat storage and dissipation system 1 illustrated in FIG. 1. The descriptions of the configurations in common to both systems are omitted. In addition, the configuration of the heat storage/dissipation material provided inside of the waste heat recovery and dissipation apparatus 50 is also common to both systems. The descriptions of the crystal structure and the thermal properties of the new titanium oxide are also omitted.

The heat storage and dissipation system 2 illustrated in FIG. 8 differs from the heat storage and dissipation system 1 illustrated in FIG. 1 in that an electromagnetic valve 66 and a temperature sensor 68 are provided to the flow channel 48. Note that for convenience of description, a portion of the upstream side of the electromagnetic valve 66 in the flow channel 48 (i.e., the portion connected to the waste heat recovery and dissipation apparatus 50) is hereinafter referred to as a flow channel 48a, and a portion of the downstream side of the electromagnetic valve 66 (i.e., the portion connected to the flow channel 22) is hereinafter referred to as a flow channel 48b. The electromagnetic valve 66 is a normal open valve, and is included in the actuator to which the ECU 60 outputs the operation signal. The temperature sensor 68 detects a temperature $Thw_2$ of the coolant flowing through the flow channel 48a, and is included in the sensors from which the ECU 60 takes in signals.

[Heat Storage and Dissipation Operations in Second Embodiment]

In the present embodiment, the ECU 60 controls a pressure of the coolant discharged from the electric type WP 14 illustrated in FIG. 8, and an opening/closing state of the electromagnetic valve 56 illustrated in FIG. 3, so that using the thermal properties of the new titanium oxide described above allows the heat storage/dissipation material 58 illustrated in FIG. 3 to perform a heat storage operation and a heat dissipation operation during the startup of the internal combustion engine 10.

The opening/closing state of the electromagnetic valve 56 is controlled in the same manner as the first embodiment. That is, in order to cause the heat storage/dissipation material 58 to perform the heat storage operation, the electromagnetic valve 56 is controlled to be in the closed state.

Unlike the first embodiment in which the electromagnetic valve 56 is controlled by always driving the electric type WP 14, in the present embodiment, the electric type WP 14 is driven only when causing the heat storage/dissipation material 58 to perform the heat dissipation operation. In the present embodiment, the electromagnetic valve 66 is controlled to be in the closed state in accordance with the startup of the drive of the electric type WP 14. That is, in the present embodiment, in order to cause the heat storage/dissipation material 58 to perform the heat dissipation operation, the electric type WP 14 is driven in combination with the control of the electromagnetic valve 66, so that the pressure in the coolant circulation flow channel from the electric type WP 14 to the electromagnetic valve 66 is increased to the pressure PHR or higher.

In the first embodiment, in order to cause the heat storage/dissipation material 58 to perform the heat dissipation operation, the pressure in the coolant circulation flow channel is generally increased by drive of the electric type WP 14. In the present embodiment, in order to cause the heat storage/dissipation material 58 to perform the heat dissipation operation, the electric type WP 14 is driven in combination with the control of the electromagnetic valve 66, so that the pressure in the coolant circulation flow channel from the electric type WP 14 to the electromagnetic valve 66 is locally increased. According to the present embodiment, the discharge pressure from the electric type WP 14 is suppressed to be capable of minimizing power consumption accompanying drive of the electric type WP 14. That is, the heat is taken out of the heat storage/dissipation material 58 efficiently, thereby enabling the internal combustion engine 10, the heater 32, the throttle body 36, and the like to be heated.

FIG. 9 is a timing chart for explaining a control outline in a case of causing the heat storage/dissipation material 58 to perform a heat dissipation operation in the second embodiment of the present disclosure. In the control of the present embodiment, as shown in timing charts in an upper part and a middle part of the figure, at time $t_0$, the electric type WP 14 is driven, the discharge pressure from the electric type WP 14 is set to a pressure $P_0$, and the electromagnetic valve 66 is set to be in a fully closed state. Then, the pressure in the flow channel 50f is increased to the pressure PHR or higher, and the heat is released from the heat storage/dissipation material 58. Therefore, the temperature $Thw_2$ shown in a lower part of FIG. 9 is increased. At time $t_1$, the electromagnetic valve 66 is returned to the opened state. Then, the flow channel 48 is opened, the coolant which receives the heat from the heat storage/dissipation material 58 suddenly flows into the flow channel 22 through the flow channel 48b, and then the temperature $Thw_2$ is rapidly lowered.

[Abnormality Determination of Heat Storage/Dissipation Material 58 in Second Embodiment]

In the present embodiment, abnormality determination of the heat storage/dissipation material 58 is performed based on the temperature $Thw_2$ while causing the heat storage/dissipation material 58 to perform the heat dissipation operation. Since the heat storage/dissipation material 58 releases the heat by the heat dissipation operation if it is normal, the temperature $Thw_2$ at time $t_1$ should be increased to the threshold value $T_1$ or higher as shown in FIG. 9. By using this, in the present embodiment, when the temperature $Thw_2$ at time $t_1$ is lower than the threshold value $T_1$, it is determined that the heat storage/dissipation material 58 is abnormal, and the heat storage operation and the heat dissipation operation are inhibited thereafter. Note that the determination time t ($=t_1-t_0$) is preset.

[Specific Processing in Second Embodiment]

FIG. 10 is a flowchart illustrating an example of processing executed by the ECU 60 in the second embodiment of the present disclosure. Note that routines (heat storage and dissipation routines) shown in this figure are repeatedly performed at each predetermined control cycle after predetermined operations (e.g., turning an ignition key to a predetermined position, and the like) are performed by a driver of the vehicle and the ignition is turned on (IG ON).

In the routines illustrated in FIG. 10, firstly, it is determined whether a heat storage mode history is present (step S120). The processing in this step is the same as the processing in step S100 in FIG. 7. When a result is determined as "absence" of the heat storage mode history (in the case of "No"), the phase of the crystal structure of the new titanium oxide contained in the heat storage/dissipation material 58 can be determined to be the β-phase, then the routine proceeds to step S122. On the other hand, when a result is determined as "presence" of the heat storage mode history (in the case of "Yes"), the phase of the crystal structure can be determined to be the λ-phase, then the routine proceeds to step S124.

In step S122, in order to cause the heat storage/dissipation material 58 to perform the heat storage operation, the electromagnetic valve 56 is closed. Then, it is determined whether $Ts>T_0$ is satisfied, where Ts and $T_0$ are a temperature and a threshold value of the heat storage/dissipation material 58, respectively (step S126). The processing in this step is the same as the processing in step S106 in FIG. 7. When determining that $Ts>T_0$ is not satisfied (in the case of "No"), the ECU 60 returns to step S126. That is, the processing in step S126 is repeated until it is determined in step S126 that $Ts>T_0$ is satisfied.

When determining in step S126 that $Ts>T_0$ is satisfied (in the case of "Yes"), the ECU 60 can determine that the new titanium oxide contained in the heat storage/dissipation material 58 makes the phase transition of the crystal structure into the λ-phase from the β-phase, and proceeds to step S128. In step S128, the electromagnetic valve 56 is returned to the opened state. Then, the heat storage mode history is recorded as "presence" in the memory of the ECU 60 (step S130).

In step S124, it is determined whether $Thw_1>T_1$ is satisfied, where $Thw_1$ and $T_1$ are a temperature and a threshold value of the coolant in the vicinity of the coolant outlet 12b, respectively. The processing in this step is the same as the processing in step S104 in FIG. 7. When determining that $Thw_1>T_1$ is not satisfied (in the case of "No"), the ECU 60 can determine that the internal combustion engine 10 needs to be heated. In order to cause the heat storage/dissipation material 58 to perform the heat dissipation operation, the drive of the electric type WP 14 is started so that the pressure in the flow channel 50f is the pressure PHR or higher, and the electromagnetic valve 66 is in the fully closed state (step S132).

Subsequently to step S132, it is determined whether the temperature $Thw_2$ and the threshold value $T_1$ satisfy the relation: $Thw_2>T_1$ after the elapse of the determination time t described in FIG. 9 (step S134). Note that the determination time t itself is counted from timing when the processing in step S132 starts. As a result of comparison, when it is determined that $Thw_2>T_1$ is not satisfied (in the case of "No"), it can be determined that abnormality occurs in the heat storage/dissipation material 58. In order to stop the heat storage operation and the heat dissipation operation thereafter, the drive of the electric type WP 14 is stopped, the electromagnetic valve 66 is returned to the opened state, and the control of the electromagnetic valve 56 is inhibited (step S136).

When it is determined in step S134 that $Thw_2>T_1$ is satisfied (in the case of "Yes"), it can be determined that the heat is released from the heat storage/dissipation material 58, and the water jacket 12 is ready to receive the heated coolant therein. Then, the electromagnetic valve 66 is returned to the opened state (step S138).

Subsequently to step S138, it is determined whether the temperature $Thw_1$ and the threshold value $T_1$ satisfy the relation: $Thw_1>T_1$ (step S140). The processing in this step is the same as the processing in step S104 in FIG. 7. When determining that $Thw_1>T_1$ is not satisfied, (in the case of "No"), the ECU 60 returns to step S140. That is, the processing in step S140 is repeated until it is determined that $Thw_1>T_1$ is satisfied.

When it is determined in step S140 that $Thw_1>T_1$ is satisfied (in the case of "Yes"), it can be determined that warming-up of the internal combustion engine 10 is completed, and the drive of the electric type WP 14 is stopped (step S142). Then, the heat storage mode history is recorded as "absence" in the memory of the ECU 60 (step S144).

According to the routines illustrated in FIG. 10, when $Thw_1>T_1$ is satisfied, the electric type WP 14 is driven in combination with the control of the electromagnetic valve 66, so that the pressure of the coolant flowing through the flow channel 50f is increased. According to the routines illustrated in FIG. 10, the abnormality of the heat storage/dissipation material 58 can be determined according to the magnitude relation between the temperature $Thw_2$ and the threshold value $T_1$ after the elapse of the determination time t.

In the above second embodiment, the electric type WP 14 is equivalent to the "pump on the engine outlet side" of the present disclosure, and the electromagnetic valve 66 is equivalent to the "control valve" of the present disclosure.

The "pressure adjusting section" of the present disclosure is realized by executing the processing in steps S132, S134, S138 by the ECU 60 in FIG. 10.

Third Embodiment

Figure 11:
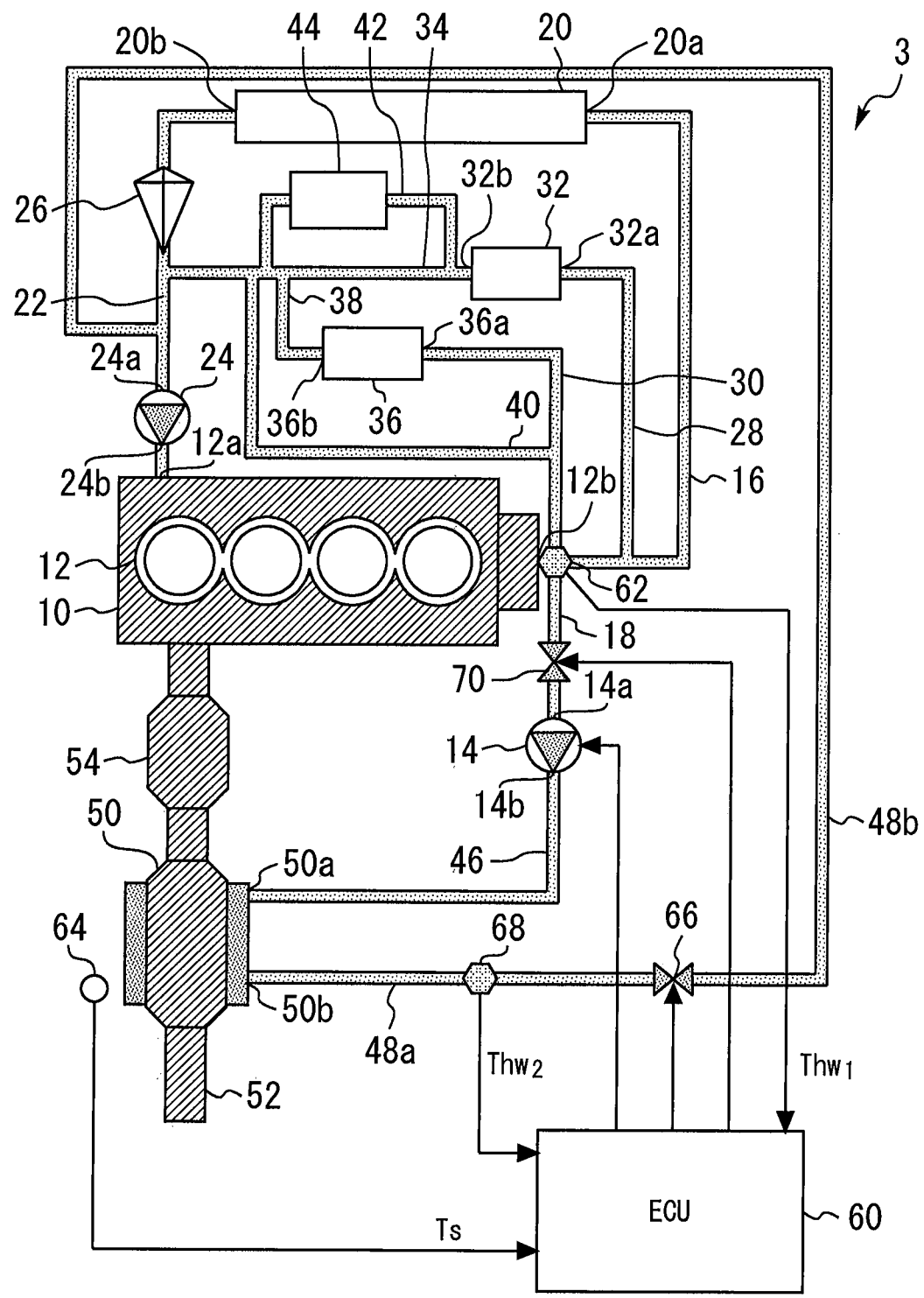
FIG. 11 is a schematic diagram illustrating an entire configuration of a heat storage and dissipation system according to a third embodiment of the present disclosure.

A third embodiment of the present disclosure is described with referent to FIG. 11.

[Description of Configuration of Heat Storage and Dissipation System]

FIG. 11 is a schematic diagram illustrating an entire configuration of a heat storage and dissipation system according to the third embodiment of the present disclosure.

A heat storage and dissipation system 3 illustrated in FIG. 11 is mounted in a vehicle, and a basic configuration thereof is common to that of the heat storage and dissipation system 2 illustrated in FIG. 8. The descriptions of the configurations in common to both systems are omitted. In addition, the configuration of the heat storage/dissipation material provided inside of the waste heat recovery and dissipation apparatus 50 is also common to both systems. The descriptions of the crystal structure and the thermal properties of the new titanium oxide are also omitted.

The heat storage and dissipation system 3 illustrated in FIG. 11 differs from the heat storage and dissipation system 2 illustrated in FIG. 8 in that an electromagnetic valve 70 is provided to the flow channel 18. The electromagnetic valve 70 is a normal open valve, and is included in the actuator to which the ECU 60 outputs the operation signal.

[Heat Storage and Dissipation Operations in Third Embodiment]

In the present embodiment, the ECU 60 controls a pressure of the coolant discharged from the electric type WP 14 illustrated in FIG. 11, an opening/closing state of the electromagnetic valves 66, 70 illustrated in FIG. 11, and an opening/closing state of the electromagnetic valve 56 illustrated in FIG. 3, so that using the thermal properties of the new titanium oxide described above allows the heat storage/dissipation material 58 illustrated in FIG. 3 to perform a heat storage operation and a heat dissipation operation alternately.

The opening/closing state of the electromagnetic valves 56, 66 and the drive of the electric type WP 14 are controlled in the same manner as the second embodiment. In the present embodiment, the electromagnetic valve 70 is controlled to be in the opened state in accordance with the startup of the drive of the electric type WP 14 in order to cause the heat storage/dissipation material 58 to perform the heat dissipation operation. Referring to the timing chart in FIG. 9, in the present embodiment, at time $t_0$, the electric type WP 14 is driven, the discharge pressure from the electric type WP 14 is set to a pressure $P_0$, and the electromagnetic valve 66 is set to be in a fully closed state. Furthermore, the electromagnetic valve 70 is set to be in the opened state. Note that the electromagnetic valve 70 can be returned to the closed state concurrently with the stop of the drive of the electric type WP 14, for example.

Since the heat storage and dissipation system 2 illustrated in FIG. 8 does not include the electromagnetic valve 70 illustrated in FIG. 11, the coolant discharged from the water jacket 12 flows through the flow channel 18, the flow channel 46, and the flow channel 48 in this order, not only when causing the heat storage/dissipation material 58 to perform the heat dissipation operation but also when not causing the heat storage/dissipation material 58 to perform the heat dissipation operation. In this regard, according the configuration of the heat storage and dissipation system 3 illustrated in FIG. 11, the flow channel 18 can be closed when not causing the heat storage/dissipation material 58 to perform the heat dissipation operation. Therefore, the coolant can efficiently flow through the flow channels when not causing the heat storage/dissipation material 58 to perform the heat dissipation operation.

Fourth Embodiment

A fourth embodiment of the present disclosure is described with referent to FIG. 12.

[Description of Configuration of Heat Storage and Dissipation System]

A heat storage and dissipation system according to the fourth embodiment differs from the heat storage and dissipation system 3 illustrated in FIG. 11 in that the mechanical type WP 24 provided on the flow channel 22 is replaced with an electric type WP. The description of a system configuration is omitted. The configuration of the heat storage/dissipation material provided inside of the waste heat recovery and dissipation apparatus 50 is common to both systems, and the descriptions of the crystal structure and the thermal properties of the new titanium oxide are also omitted. The electric type WP according to the present disclosure (hereinafter, referred to as a "WP on the flow channel 22") is configured in the same manner as the electric type WP 14. A motor in the WP on the flow channel 22 is included in the actuator to which the ECU 60 outputs the operation signal.

[Heat Storage and Dissipation Operations in Fourth Embodiment]

The opening/closing state of the electromagnetic valves 56, 66, 70 and the drive of the electric type WP 14 are controlled in the same manner as the third embodiment. Unlike the third embodiment in which the coolant flows into the water jacket 12 by the drive of the mechanical type WP 24 automatically, the drive of the motor in the WP on the flow channel 22 is controlled (flow stop control) so that the coolant does not flow into the water jacket 12 from the flow channel 22 until warming-up of the internal combustion engine 10 is completed. When the flow stop control is performed, the heat from the heat storage/dissipation material 58 may not be used for warming-up of the internal combustion engine 10 and the like even when the coolant having received the heat from the heat storage/dissipation material 58 flows to the flow channel 22 by opening the flow channel 48.

In the present embodiment, the opening of the flow channel 48 is waited for until the flow stop control is completed even after the elapse of the determination time t described in FIG. 9. In the other word, after the elapse of the determination time t, the flow channel 48 is opened at timing when the flow stop control is completed. According to the present embodiment, in the system provided with the WP on the flow channel 22, the coolant having received the heat from the heat storage/dissipation material 58 can be sent to the water jacket 12 in accordance with timing when the flow of the coolant into the water jacket 12 is permitted. It is expected that the valve of the thermostat 26 is in the opened state when warming-up of the internal combustion engine 10 is completed. If the flow channel 48 is opened at timing when the flow stop control is completed, the intermediate-temperature coolant obtained by mixing the high-temperature coolant having received the heat from the heat storage/dissipation material 58 and the low-temperature coolant having passed through the radiator 20 is sent to the water jacket 12 by drive of the motor in the WP on the flow channel 22. Therefore, the internal combustion engine 10 immediately after completion of warming-up can be gently cooled, as compared with a case for sending only coolant having passed through the radiator 20 to the water jacket 12 at timing when the flow stop control is completed.

[Specific Processing in Fourth Embodiment]

FIG. 12 is a flowchart illustrating an example of processing executed by the ECU 60 in the fourth embodiment of the present disclosure. Most of processing routines illustrated in FIG. 12 are common to the processing routines illustrated in FIG. 10. Processing common to both figures are attached with the same reference signs to omit duplicated descriptions.

In the routines illustrated in FIG. 12, when it is determined in step S124 that $Thw_1 > T_1$ is not satisfied (in the case of "No"), it can be determined that the internal combustion engine 10 needs to be heated. In order to perform the flow stop control, the drive of the motor in the WP on the flow channel 22 is controlled (step S150). Then, processing in steps S132, S134 (see FIG. 10) is performed.

When determining in step S134 that $Thw_2>T_1$ is satisfied (in the case of "Yes"), it is determined whether the temperature $Thw_1$ and the threshold value $T_1$ satisfy the relation: $Thw_1 >T_1$ (step S152). The processing in this step is basically the same as the processing in step S114 in FIG. 7. As a result of comparison between the temperature $Thw_1$ and the threshold value $T_1$, when determining that $Thw_1>T_1$ is not satisfied (in the case of "No"), the ECU 60 returns to step S152. That is, the processing in step S152 is repeated until it is determined that $Thw_1>T_1$ is satisfied.

When it is determined in step S152 that $Thw_1>T_1$ is satisfied (in the case of "Yes"), it can be determined that warming-up of the internal combustion engine 10 is completed. In order to complete the flow stop control, the drive of the motor in the WP on the flow channel 22 is controlled (step S154). The electromagnetic valve 66 is returned to the opened state, and the drive of the electric type WP 14 is stopped (step S156). Then, the heat storage mode history is recorded as "absence" in the memory of the ECU 60 (step S158).

According to the routines illustrated in FIG. 12, the opening of the flow channel 48 is waited for until the flow stop control is completed, the coolant having received the heat from the heat storage/dissipation material 58 can be sent to the flow channel 22 after completion of the flow stop control. The coolant having received the heat from the heat storage/dissipation material 58 can be sent to the water jacket 12 in accordance with timing when the flow of the coolant into the water jacket 12 is permitted.

In the above fourth embodiment, the WP on the flow channel 22 is equivalent to the "pump on the engine inlet side" of the present disclosure.

The "discharge stopping section" of the present disclosure is realized by executing the processing in step S150 by the ECU 60 in FIG. 12.

Fifth Embodiment

Figure 13:
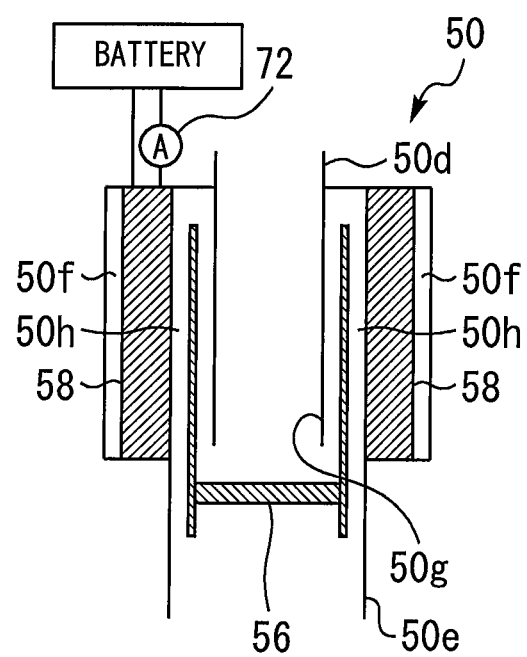
FIG. 13 is a cross-sectional view of the waste heat recovery and dissipation apparatus 50 applied to a fifth embodiment of the present disclosure.
Figure 14:
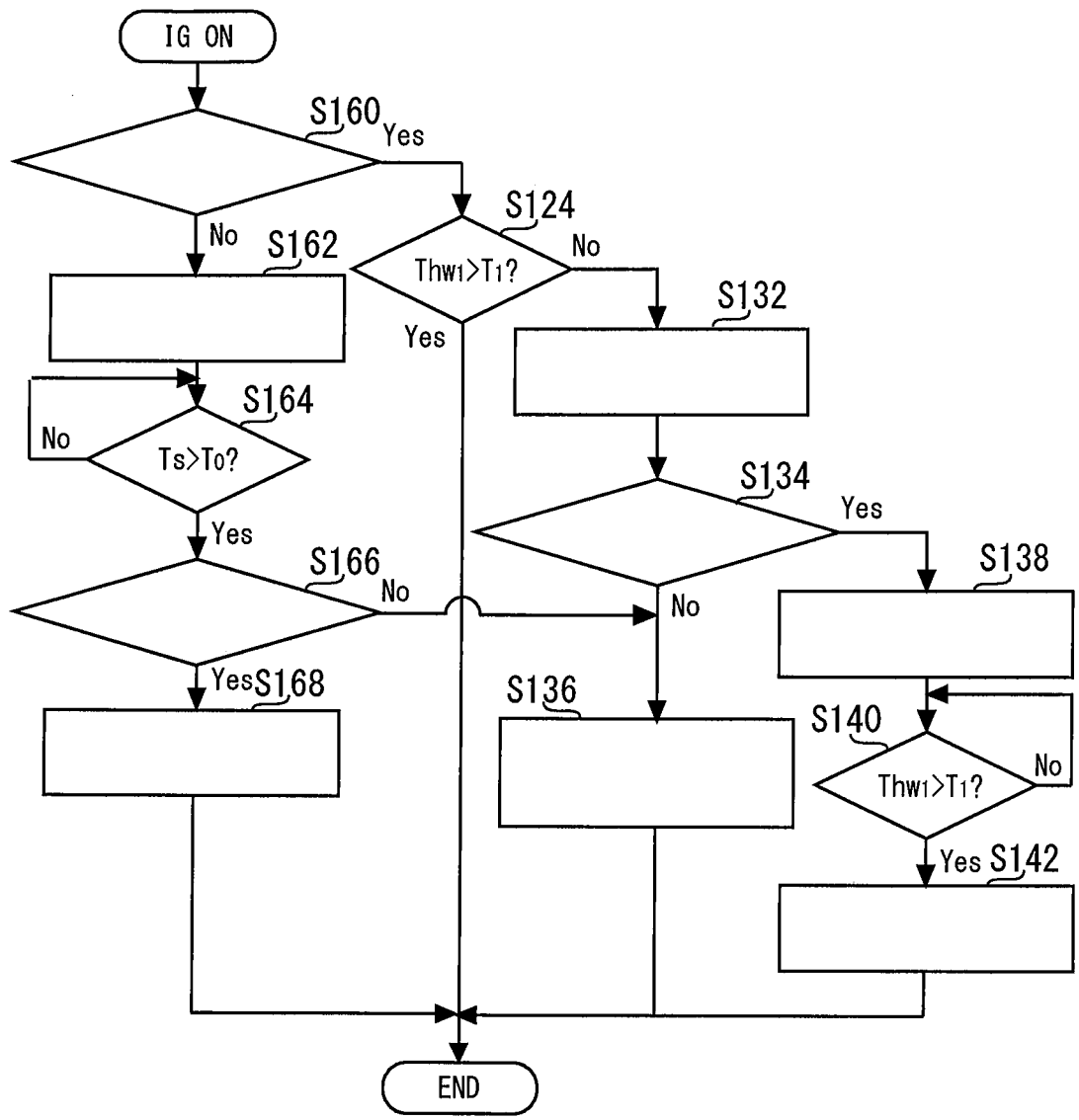
FIG. 14 is a flowchart illustrating an example of processing executed by the ECU 60 in the fifth embodiment of the present disclosure.

A fifth embodiment of the present disclosure is described with referent to FIGS. 13 and 14. In the present embodiment, the determination of the phase of the crystal structure of the new titanium oxide and the abnormality determination of the heat storage/dissipation material 58 are performed based on a detection value of an ammeter provided to the waste heat recovery and dissipation apparatus 50, in the heat storage and dissipation system 2 illustrated in FIG. 8 or in the heat storage and dissipation system 3 illustrated in FIG. 11. The descriptions of the system configuration and the like are omitted.

FIG. 13 is a cross-sectional view of the waste heat recovery and dissipation apparatus 50 applied to the fifth embodiment of the present disclosure. This figure illustrates a state where the electromagnetic valve 56 is closed. As illustrated in FIG. 13, an ammeter 72 is attached in the waste heat recovery and dissipation apparatus 50, the ammeter detecting a current flowing through the heat storage/dissipation material 58 when a potential difference is applied between terminals. The ammeter 72 is included in the sensors from which the ECU 60 takes in signals.

[Determination of Crystal Structure of New Titanium Oxide]

As described above, the new titanium oxide exhibits semiconductor properties when the phase of the crystal structure is the β-phase, and metallic properties when the phase of the crystal structure is the λ-phase. In the present embodiment, the crystal structure is determined by using the electrical characteristics. Specifically, it is determined whether the phase of the crystal structure is the λ-phase or the β-phase based on a detection value of the ammeter 72 by using a current value measured when the phase of the crystal structure is the λ-phase as a reference.

[Abnormality Determination of Heat Storage/Dissipation Material 58 in Fifth Embodiment]

In the present embodiment, the abnormality determination of the heat storage/dissipation material 58 is performed based on the detection value of the ammeter 72 at timing immediately after causing the heat storage/dissipation material 58 to perform the heat storage operation. If the heat storage/dissipation material 58 is normal, the phase of the crystal structure is the λ-phase by causing the heat storage/dissipation material 58 to perform the heat storage operation, and the detection value of the ammeter 72 is equal to the reference value. By using this, in the present embodiment, if the detection value of the ammeter 72 is remarkably deviated from the reference value, it is determined that the heat storage/dissipation material 58 is abnormal, and the heat storage operation and the heat dissipation operation are inhibited thereafter.

[Specific Processing in Fifth Embodiment]

FIG. 14 is a flowchart illustrating an example of processing executed by the ECU 60 in the fifth embodiment of the present disclosure. Most of processing routines illustrated in FIG. 14 are common to the processing routines illustrated in FIG. 10. Processing common to both figures are attached with the same reference signs to omit duplicated descriptions.

In the routines illustrated in FIG. 14, firstly, it is determined whether a difference between the detection value of the ammeter 72 and the reference value is below a threshold value $A_0$ (step S160). In step S160, the ECU 60 acquires the detection value of the ammeter 72, and compares it with the threshold value $A_0$. The threshold value $A_0$ is preset as a current value at which it can be determined that the heat storage/dissipation material 58 is abnormal. As a result of comparison, when it is determined that the current value difference<$A_0$ is not satisfied (in the case of "No"), it can be determined that the phase of the crystal structure of the new titanium oxide contained in the heat storage/dissipation material 58 is the β-phase, and the routine proceeds to step S162. On the other hand, when it is determined that the current value difference<$A_0$ is satisfied (in the case of "Yes"), it can be determined that the phase of the crystal structure is the λ-phase, and the routine proceeds to step S124.

In step S162, in order to cause the heat storage/dissipation material 58 to perform the heat storage operation, the electromagnetic valve 56 is closed. Then, it is determined whether $Ts>T_0$ is satisfied, where Ts and $T_0$ are a temperature and a threshold value of the heat storage/dissipation material 58, respectively (step S164). The processing in this step is the same as the processing in step S126 in FIG. 10. When determining that $Ts>T_0$ is not satisfied (in the case of "No"), the ECU 60 returns to step S164. That is, the processing in step S164 is repeated until it is determined in step S164 that $Ts>T_0$ is satisfied.

When it is determined in step S164 that $Ts>T_0$ is satisfied (in the case of "Yes"), it is determined again whether the difference between the detection value of the ammeter 72 and the reference value is below the threshold value $A_0$ (step S166). The processing in this step is the same as the processing in step S160. As a result of comparison between the current value and the threshold value $A_0$, when it is determined that the current value difference<$A_0$ is not satisfied (in the case of "No"), it can be determined that abnormality occurs in the heat storage/dissipation material 58, and the routine proceeds to step S136.

When it is determined in step S166 that the current value difference<$A_0$ is satisfied (in the case of "Yes"), it can be determined that the new titanium oxide contained in the heat storage/dissipation material 58 makes the phase transition of the crystal structure into the λ-phase from the β-phase, and the electromagnetic valve 56 is returned to the opened state (step S168).

According to the routines illustrated in FIG. 14, the determination of the phase of the crystal structure of the new titanium oxide and the abnormality determination of the heat storage/dissipation material 58 are performed based on the difference between the detection value of the ammeter 72 and the reference value.

Sixth Embodiment

Figure 15:
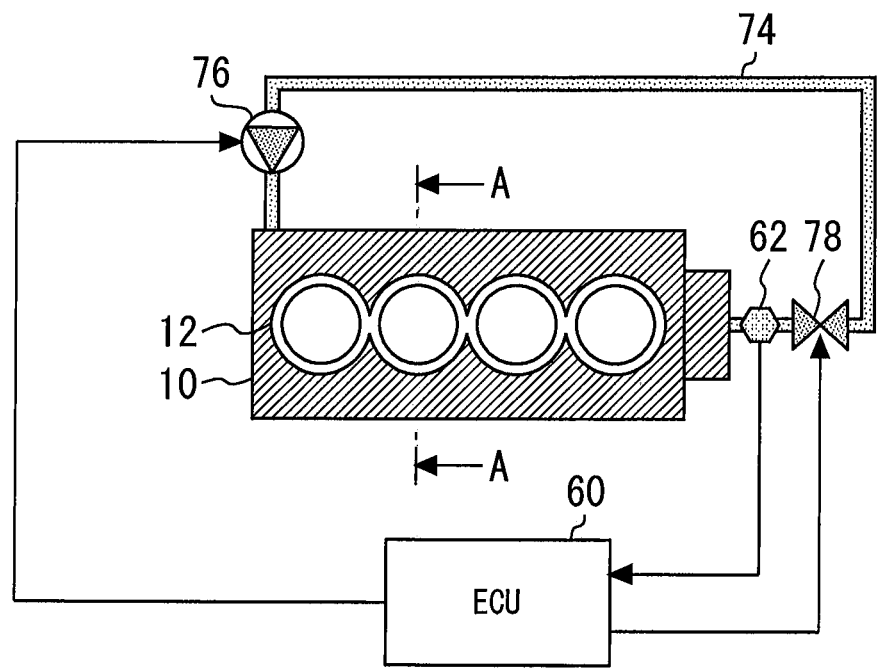
FIG. 15 is a schematic diagram illustrating the internal combustion engine 10 applied to a sixth embodiment of the present disclosure.
Figure 16:
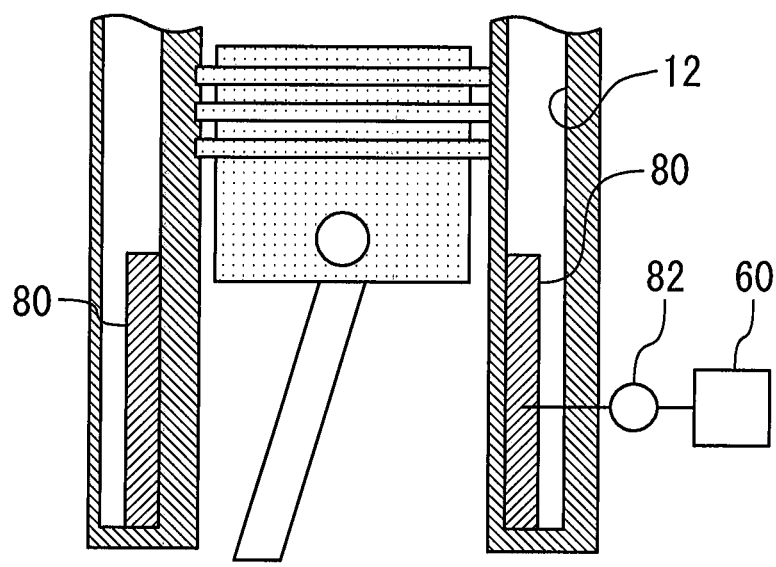
FIG. 16 is a vertical cross-section view taken along line A-A of FIG. 15.

A sixth embodiment of the present disclosure is described with referent to FIGS. 15 and 16. In the present embodiment, a heat storage/dissipation material having a similar composition to the heat storage/dissipation material 58 is provided inside of the water jacket 12 illustrated in FIG. 1 and the like in order to cause the heat storage/dissipation material to perform a heat storage operation and a heat dissipation operation in the heat storage and dissipation system of the above fourth embodiment.

FIG. 15 is a schematic diagram illustrating the internal combustion engine 10 applied to the sixth embodiment of the present disclosure. A flow channel 74 illustrated in FIG. 15 is equivalent to a flow channel which passes through the flow channel 28 or the flow channel 30 branched from the middle of the flow channel 16 and is returned to the flow channel 22 as illustrated in FIG. 1. An electric type WP 76 is provided to the flow channel 74. The electric type WP 76 is a water pump which is equivalent to the WP on the flow channel 22, and is included in the actuator to which the ECU 60 outputs the operation signal. An electromagnetic valve 78 is provided to the flow channel 16 in the vicinity of the coolant outlet 12b. The electromagnetic valve 78 is a normal open valve, and is included in the actuator to which the ECU 60 outputs the operation signal.

FIG. 16 is a vertical cross-section view taken along line A-A of FIG. 15. As illustrated in FIG. 16, a heat storage/dissipation material 80 is provided inside of the water jacket 12 as a water jacket spacer. A temperature sensor 82 is attached to the heat storage/dissipation material 80. The temperature sensor 82 detects a temperature of the heat storage/dissipation material 80 and is included in the sensors from which the ECU 60 takes in signals.

[Heat Storage and Dissipation Operations in Sixth Embodiment]

In the present embodiment, the heat generated in the internal combustion engine 10 is stored in the heat storage/dissipation material 80 through a cylinder bore wall surface. That is, the heat storage operation of the heat storage/dissipation material 80 is performed in the natural course. In the present embodiment, the electric type WP 76 is driven in combination with the control of the electromagnetic valve 78, so that the pressure in the coolant circulation flow channel from the electric type WP 76 to the electromagnetic valve 78 is increased to the pressure PHR or higher.

In the above fourth embodiment, the flow stop control is performed until warming-up of the internal combustion engine 10 is completed. On the other hand, in the present embodiment, the electric type WP 76 is positively driven without performing the flow stop control, and the heat is released from the heat storage/dissipation material 80, thereby enabling the coolant in the water jacket 12 to be heated. According to the control of the present disclosure, the internal combustion engine 10 can be warmed up faster, as compared with a case for performing the flow stop control.

In the above sixth embodiment, the electric type WP 76 is equivalent to the "pump on the engine outlet side" of the present disclosure, and the electromagnetic valve 66 is equivalent to the "control valve" of the present disclosure. The heat storage/dissipation material 58 illustrated in FIG. 1 and the like is equivalent to the "first heat storage/dissipation material" of the present disclosure, and the heat storage/dissipation material 80 illustrated in FIG. 16 is equivalent to the "second heat storage/dissipation material" of the present disclosure.

What is claimed is:

1. A heat storage and dissipation system for a vehicle, comprising:

a circulation flow channel in which a heat medium circulates while flowing through an internal combustion engine mounted on a vehicle and its related parts;

a heat storage/dissipation material which is provided at a place where heat exchange with the heat medium flowing in the circulation flow channel can be performed, and contains a titanium oxide having a composition of $Ti_3O_5$, wherein the titanium oxide having properties:

when being heated to a predetermined heat storage temperature or higher in a state where the phase of the crystal structure is the β-phase, the crystal structure makes the phase transition into the λ-phase to store outside heat;

even when being cooled to below the heat storage temperature in a state where the phase of the crystal structure is the λ-phase, the crystal structure does not make the phase transition into the β-phase; and when a predetermined heat dissipation pressure or higher is applied to the titanium oxide, the crystal structure makes the phase transition into the β-phase from the λ-phase to release the heat to the outside; and a pressure control section which is configured to increase a pressure of the heat medium at an installation place of the heat storage/dissipation material, during the startup of the internal combustion engine, so that the heat storage/dissipation material receives from the heat medium flowing through the installation place a pressure higher than the heat dissipation pressure, the pressure control section including a control valve which is provided between a heat medium outlet of a heat storage/dissipation section including the heat storage/dissipation material which is provided in an exhaust passage of the internal combustion engine and a heat medium inlet of the water jacket in the circulation flow channel.

2. The heat storage and dissipation system for a vehicle according to claim 1, wherein the pressure control section is also configured to decrease, after increasing the pressure of the heat medium of the heat medium at the installation place, the pressure of the heat medium at the installation place so that the pressure of the heat medium flowing through the installation place is below the heat dissipation pressure.

3. The heat storage and dissipation system for a vehicle according to claim 1, wherein the heat storage/dissipation material is provided at a place where heat generated in the internal combustion engine can be received, wherein the pressure control section is also configured to control the pressure of the heat medium at the installation place, when it is determined that the phase of the crystal structure is the β-phase, so that the pressure of the heat medium flowing through the installation place is below the heat dissipation pressure before increasing the pressure of the heat medium flowing through the installation place.

4. The heat storage and dissipation system for a vehicle according to claim 1, wherein the heat storage/dissipation material is incorporated in a heat storage/dissipation section which is provided in an exhaust passage of the internal combustion engine, the pressure control section comprises:
a pump on an engine outlet side which is provided between a heat medium outlet of a water jacket of the internal combustion engine and a heat medium inlet of the heat storage/dissipation section in the circulation flow channel, and is configured to discharge the heat medium toward the heat medium inlet of the heat storage/dissipation section;
a pressure adjusting section which is configured to adjust a pressure of the heat medium at the installation place by adjusting an opening degree of the control valve and a discharge pressure of the heat medium from the pump on the engine outlet side, and
the pressure adjusting section is also configured to:
adjust the discharge pressure constantly;
adjust the opening degree of the control valve upon rising the pressure of the heat medium at the installation place so as to cut off the flow of the heat medium from the heat medium outlet of the heat storage/dissipation section to the heat medium inlet of the water jacket; and
after increasing the pressure of the heat medium at the installation place, adjust the opening degree of the control valve so as to release the control valve cutoff.

5. The heat storage and dissipation system for a vehicle according to claim 4, wherein the pressure adjusting section is also configured to:
adjust the opening degree so as to cut off the flow of the heat medium from the heat medium outlet of the heat storage/dissipation section to the heat medium inlet of the water jacket for a predetermined heat dissipation period, the heat dissipation period starts when it is determined that a temperature of the heat medium at the heat medium outlet of the water jacket is below a determination temperature; and
adjust the opening degree so as to release the control valve cutoff when it is determined that the temperature of the heat medium at the installation place is increased to the determination temperature or higher by the end of the heat dissipation period.

6. The heat storage and dissipation system for a vehicle according to claim 5, comprising:
a pump on an engine inlet side which is provided to the circulation flow channel and is configured to discharge the heat medium toward the heat medium inlet of the water jacket; and
a discharge stopping section which is configured to stop the heat medium discharge from the pump on the engine inlet side temporarily until it is determined that the temperature of the heat medium at the heat medium outlet of the water jacket is increased to the determination temperature or higher during the startup of the internal combustion engine,
wherein the pressure adjusting section is also configured to wait for the release of the control valve cutoff while the heat medium discharge from the pump on the engine inlet side is stopped by the discharge stopping section, even when it is determined that the temperature of the heat medium at the installation place is increased to the determination temperature or higher by the end of the heat dissipation period.

7. The heat storage and dissipation system for a vehicle according to claim 4, wherein the pressure adjusting section is also configured to:
adjust the opening degree of the control valve so as to cut off the flow of the heat medium from the heat medium outlet of the heat storage/dissipation section to the heat medium inlet of the water jacket over a predetermined heat dissipation period from a time when it is determined that the temperature of the heat medium at the heat medium outlet of the water jacket is below a predetermined determination temperature; and
determine that an abnormality occurs in the heat storage/dissipation material when it is determined that the temperature of the heat medium at the installation place is not increased to the determination temperature or higher by the end of the heat dissipation period.

8. The heat storage and dissipation system for a vehicle according to claim 1, wherein
the heat storage/dissipation material is incorporated in a water jacket of the internal combustion engine, and
the pressure control section comprises:
a pump on an engine inlet side which is configured to discharge the heat medium toward the heat medium inlet of the water jacket;
a pressure adjusting section which is configured to adjust a pressure of the heat medium at the installation place by adjusting an opening degree of the control valve and a discharge pressure of the heat medium from the pump on the engine inlet side, and
the pressure adjusting section is also configured to:
adjust the discharge pressure constantly;
adjust the opening degree of the control valve so as to increase that the pressure of the heat medium at the installation place by cutting off the flow of the heat medium to the downstream side of the control valve; and
after increasing the pressure of the heat medium at the installation place, adjust the opening degree of the control valve by releasing the control valve cutoff.

9. A heat storage and dissipation system for a vehicle, comprising:
a circulation flow channel in which a heat medium circulates while flowing through an internal combustion engine mounted on a vehicle and its related parts;
a heat storage/dissipation material which is provided at a place where heat exchange with the heat medium flowing in the circulation flow channel can be performed, and contains a titanium oxide having a composition of $Ti_3O_5$, wherein the titanium oxide having properties:
when being heated to a predetermined heat storage temperature or higher in a state where the phase of the crystal structure is the β-phase, the crystal structure makes the phase transition into the λ-phase to store outside heat;
even when being cooled to below the heat storage temperature in a state where the phase of the crystal structure is the λ-phase, the crystal structure does not make the phase transition into the β-phase; and
when a predetermined heat dissipation pressure or higher is applied to the titanium oxide, the crystal structure makes the phase transition into the β-phase from the λ-phase to release the heat to the outside; and a pressure control section which is configured to increase a pressure of the heat medium at an installation place of the heat storage/dissipation material, during the startup of the internal combustion engine, so that the heat storage/dissipation material receives from the heat medium flowing through the installation place a pressure higher than the heat dissipation pressure, wherein, the heat storage/dissipation material comprises:

a first heat storage/dissipation material which is incorporated in a heat storage/dissipation section provided in the exhaust passage of the internal combustion engine and a second storage/dissipation material which is incorporated in a water jacket of the internal combustion engine, the pressure control section comprises:

a pump on an engine outlet side which is provided between a heat medium outlet of a water jacket of the internal combustion engine and a heat medium inlet of the heat storage/dissipation section in the circulation flow channel, and is configured to discharge the heat medium toward the heat medium inlet of the heat storage/dissipation section a first control valve which is provided between a heat medium outlet of the heat storage/dissipation section and a heat medium inlet of the water jacket, the heat storage/dissipation section provided in an exhaust passage of the internal combustion engine and a heat medium inlet of the water jacket, in the circulation flow channel;

a first pressure adjusting section which is configured to adjust a first pressure of the heat medium at an installation place of the first heat storage/dissipation material by adjusting an opening degree of the first control valve and a first discharge pressure of the heat medium from the pump on the engine outlet side;

a pump on an engine inlet side which is configured to discharge the heat medium toward the heat medium inlet of the water jacket;

a second control valve which is provided at the heat medium outlet of the water jacket; and a second pressure adjusting section which is configured to adjust a second pressure of the heat medium at an installation place of the second heat storage/dissipation material by adjusting an opening degree of the second control valve and a second discharge pressure of the heat medium from the pump on the engine inlet side, and the first pressure adjusting section is also configured to:

adjust the first discharge pressure constantly;

adjust the opening degree of the first control valve upon rising the pressure of the heat medium at the installation place of the first heat storage/dissipation material so as to cut off the flow of the heat medium from the heat medium outlet of the heat storage/dissipation section to the heat medium inlet of the water jacket; and after increasing the pressure of the heat medium at the installation place of the first heat storage/dissipation material, adjust the opening degree of the first control valve so as to release the first control valve cutoff, the second pressure adjusting section is also configured to:

adjust the discharge pressure constantly;

adjust the opening degree of the second control valve so as to increase that the pressure of the heat medium at the installation place of the second heat storage/dissipation material by cutting off the flow of the heat medium to the downstream side of the second control valve; and after increasing the pressure of the heat medium at the installation place of the second heat storage/dissipation material, adjust the opening degree of the second control valve by releasing the second control valve cutoff.

* * * * *